United States Patent
Montague et al.

(10) Patent No.: US 7,296,813 B2
(45) Date of Patent: Nov. 20, 2007

(54) MANUALLY HEIGHT ADJUSTABLE AND ROTATABLE STEERING ASSEMBLY FOR BICYCLES

(76) Inventors: David Montague, 9 Eastabrook Rd., Newton, MA (US) 02465; Harry Montague, 9 Osbourne Rd., Brookline, MA (US) 02446

(*) Notice: Subject to any disclaimer, the term of this patent is extended or adjusted under 35 U.S.C. 154(b) by 0 days.

(21) Appl. No.: 11/248,343

(22) Filed: Oct. 13, 2005

(65) Prior Publication Data

US 2006/0076752 A1    Apr. 13, 2006

Related U.S. Application Data

(63) Continuation of application No. 10/769,774, filed on Feb. 3, 2004, now abandoned.

(51) Int. Cl.
*B62K 21/00*    (2006.01)
(52) U.S. Cl. .................................. 280/279; 280/276
(58) Field of Classification Search ............... 280/272, 280/276, 279, 280, 278, 287; 74/551.1, 551.2, 74/551.3
See application file for complete search history.

(56) References Cited

U.S. PATENT DOCUMENTS

| | | | | |
|---|---|---|---|---|
| 3,787,126 A | * | 1/1974 | Arlen | 403/104 |
| 4,043,688 A | * | 8/1977 | Humlong | 403/209 |
| 4,095,911 A | * | 6/1978 | Lacroix | 403/104 |
| 4,113,395 A | * | 9/1978 | Pawsat et al. | 403/22 |
| 4,310,260 A | * | 1/1982 | Katayama | 403/7 |
| 4,322,087 A | * | 3/1982 | Addicks | 280/279 |
| 4,390,300 A | * | 6/1983 | Foster | 403/24 |
| 4,410,197 A | * | 10/1983 | St. Hillaire | 280/279 |
| 4,448,435 A | | 5/1984 | Hon | |
| 4,466,629 A | * | 8/1984 | Sinyard | 280/279 |
| 4,531,756 A | * | 7/1985 | Mori | 280/279 |
| 5,003,839 A | * | 4/1991 | Yang | 74/551.1 |
| 5,095,770 A | * | 3/1992 | Rader, III | 74/551.1 |
| 5,782,479 A | | 7/1998 | Adams et al. | |

(Continued)

FOREIGN PATENT DOCUMENTS

EP    0 687 620 A1    12/1995

(Continued)

*Primary Examiner*—Tony Winner
(74) *Attorney, Agent, or Firm*—Sughrue Mion PLLC

(57) ABSTRACT

An apparatus and method of securing a bicycle handlebar stem to the front wheel fork steerer tube with handlebar height adjustability and rotation of the handlebar and stem for easy storage. A steering assembly is provided where the handlebar stem is moveably fastened to the front fork steerer tube using a manually operated primary locking device and requiring a secondary action to allow for movement in the form of either height adjustment, or rotation, or both. The connection between the handlebar stem and the front fork steerer tube can be on the interior or the exterior of the front fork steerer tube. With the interior connection, the steerer tube can be elongated to extend above the top of the headset bearings where it is fitted with a collar for clamping onto the internally mounted stem. The handlebar stem and fork steerer tube are fitted with corresponding octagonal or other cross sectional shapes, or a safety tracking system. For bicycles equipped with handlebar stems which clamp to the outside of the fork steerer tube, the handlebar stem is equipped with a safety lock and can be rotated for storage with no height adjustability.

16 Claims, 31 Drawing Sheets

U.S. PATENT DOCUMENTS

| | | |
|---|---|---|
| 6,343,806 B1 | 2/2002 | Lee |
| 6,581,482 B2 | 6/2003 | Cappa et al. |
| 6,619,683 B1 | 9/2003 | Lin et al. |
| 2002/0139217 A1 | 10/2002 | Montague et al. |

FOREIGN PATENT DOCUMENTS

| | | |
|---|---|---|
| GB | 2 296 224 A | 6/1996 |
| JP | 7-052862 | 2/1995 |
| JP | 08-198168 | 6/1996 |
| JP | 8-332986 | 12/1996 |
| JP | 10-119866 | 5/1998 |
| JP | 11-020759 | 1/1999 |
| JP | 2000-153794 | 6/2000 |
| JP | 2001-130463 | 5/2001 |

* cited by examiner

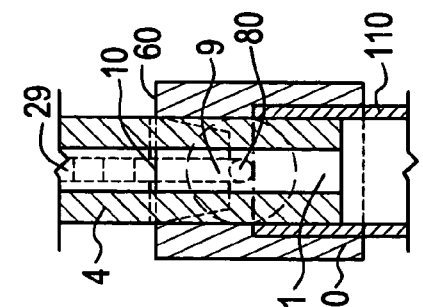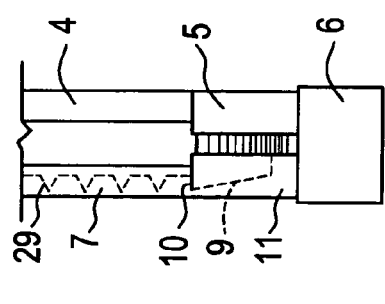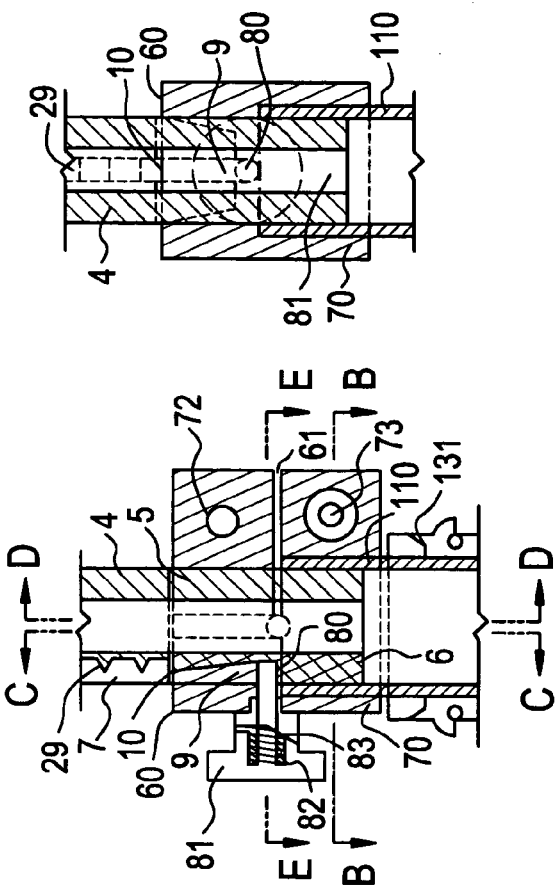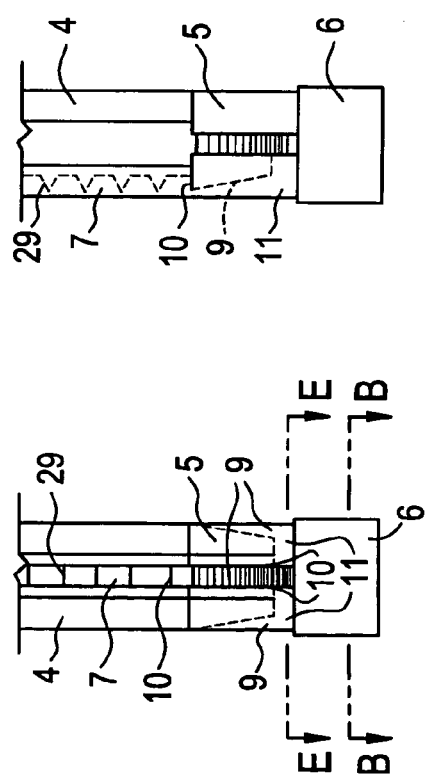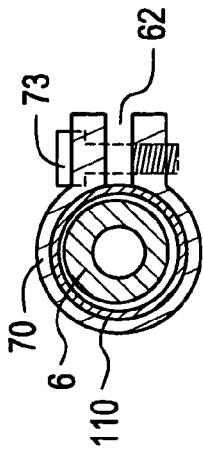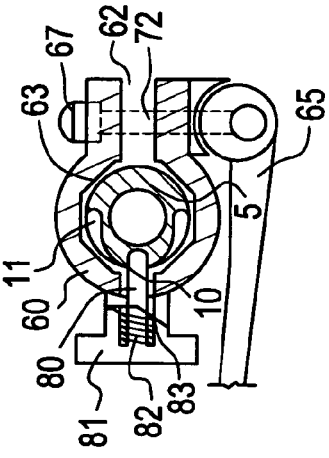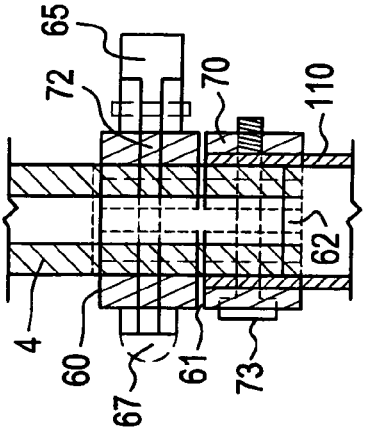

FIG. 20A
FIG. 20B
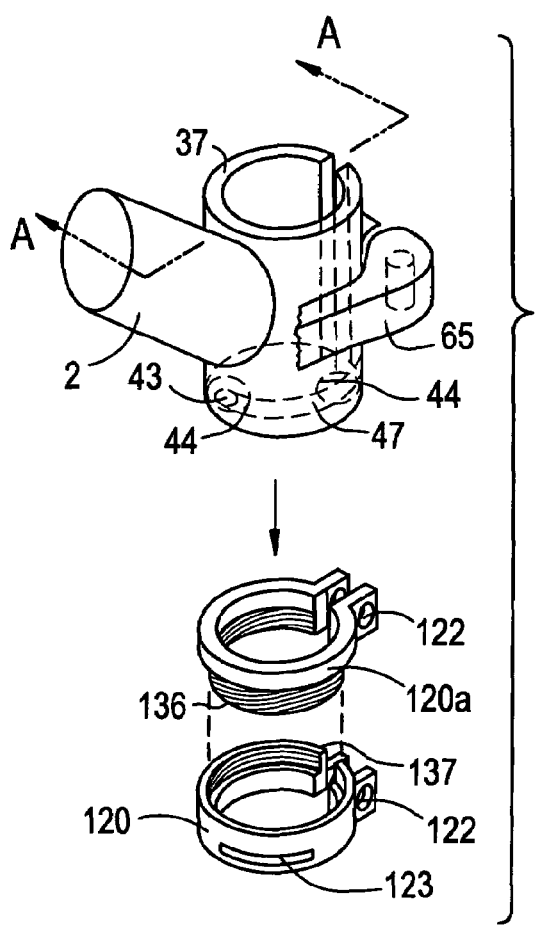
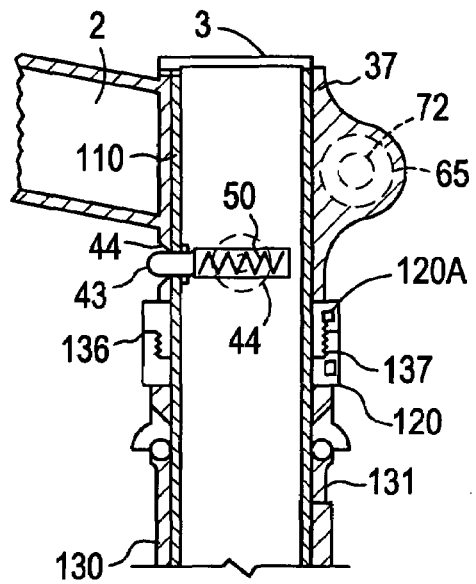

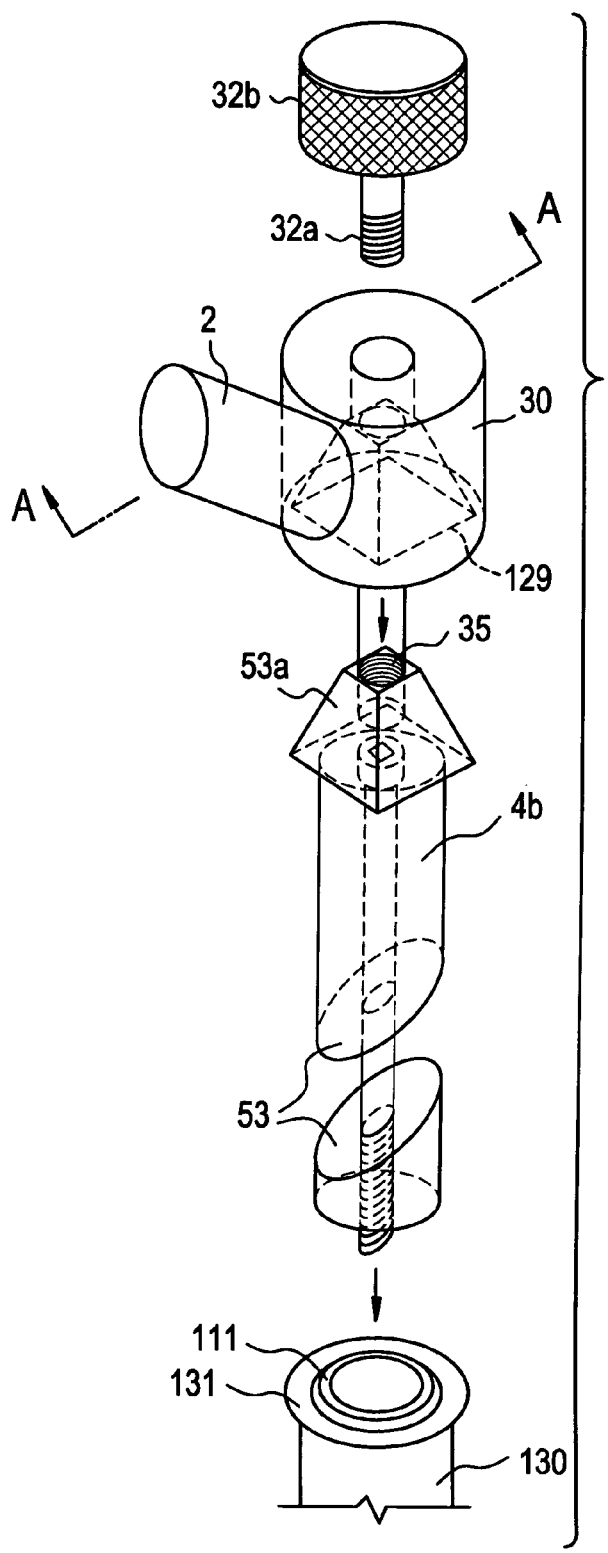
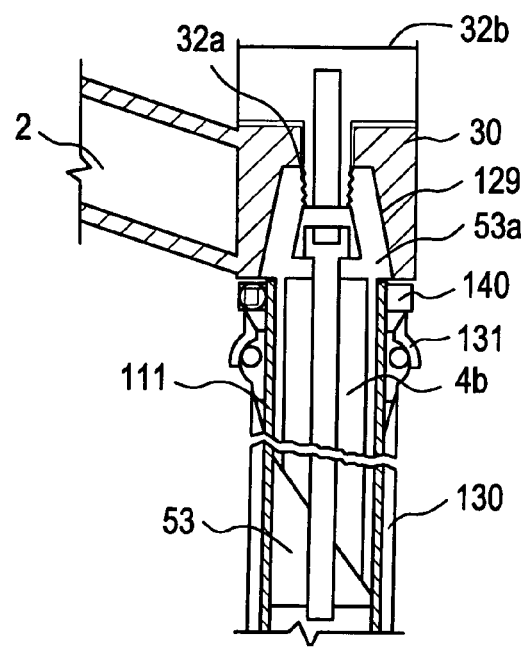
FIG. 22A
FIG. 22B

MANUALLY HEIGHT ADJUSTABLE AND ROTATABLE STEERING ASSEMBLY FOR BICYCLES

This is a continuation application of U.S. application Ser. No. 10/769,774 filed Feb. 3, 2004 now abandoned. The entire disclosure of the prior application, is hereby incorporated by reference.

I. BACKGROUND OF THE INVENTION a. Field of the Invention

This invention relates to the steering assembly on bicycles. In particular, this invention relates to the method and apparatus of securing a bicycle handlebar stem to the front wheel fork steerer tube in a manner that is both safe and convenient for the operator. The steering assemblies of this invention are intended to improve upon existing technology in the two areas—handlebar height adjustability and rotation of the handlebar such that the handlebars end up parallel to the front wheel and the vehicle frame for easy storage.

b. Prior Art

Bicycles are often used only occasionally and stored frequently for extended periods of time. Yet, due to the laterally protruding handlebars, storage is not particularly convenient. To date, there have been few bicycle steering assemblies that could be manually (without the use of tools) adjusted in height, and none that are manually height adjustable and rotatable for storage. Increasingly, consumers are demanding more comfort with an easily adjustable wide range of handlebar heights or positions. Height adjustability, using tools, has always been available and recently has been augmented by offering an adjustable tilt up of the horizontal stem section. But so far, manually (without the use of tools) adjustability has never been available on regular bicycles. The word "manually" shall be used in the context of this disclosure to mean "without the use of tools". In fact, the standard quill type stem found on many bicycles of today requires that a tool be used for height adjustment. While some operators use the tool properly, it has been found that many do not, leading to the potentially unsafe situation of the handlebar rotating differently from the front wheel during riding.

Representative prior art includes:

[1] U.S. Patents
U.S. Pat. No. 5,727,427 Mar. 17, 1998 Nien
U.S. Pat. No. 5,537,878 Apr. 21, 1996 Hartley
U.S. Pat. No. 5,570,614 Nov. 5, 1996 Nastrucci
U.S. Pat. No. 5,680,798 Jul. 30, 1996 Johnson
U.S. Pat. No. 4,433,852 Feb. 28, 1984 Hon

[2] Foreign Patent Documents
JP21130463A2 May 15, 2001 Japan
JP2000153794 Jun. 6, 2000 Japan
JP10119866A2 May 12, 1998 Japan
JP8324479A2 Dec. 10, 1996 Japan
JP8198168A2 Aug. 6, 1996 Japan
JP8091272A2 Apr. 9, 1996 Japan
GB 2 296 224 A Jun. 26, 1996 England
JP8332986A2 Jun. 7, 1996 Japan
EP0687620A1 Dec. 20, 1995 Germany
JP7052862A2 Feb. 28, 1995 Japan In the prior art there have been no handlebar steering assemblies that could be safely rotated horizontally (rotating about the steering axis) 90 degrees for easy storage. In addition, other than co-pending U.S. patent application Ser. No. 09/823,765 there have been no handlebar stems whose height is adjustable by hand, that can be rotated for storage.

A great number of handlebar stems have focused on being light and strong with U.S. Pat. No. 5,095,770 and U.S. Pat. No. 5,680,798 representative of those proposals. However, all are limited by not having the ability to be manually adjustable in height nor can they be rotated for storage.

A number of patents address the issue of storage but not in a useful manner. The most common approach to reducing the width of the handlebar is by breaking the handlebar into pieces and pivoting them. Some examples of this include U.S. Pat. No. 5,570,614, EP 0 687 620 A1, JP10119866A2, and JP07052862A2. Another method used to reduce the width is by tilting one end of the handlebar up in the air making the bicycle narrower but much taller. This is disclosed in U.S. Pat. No. 5,727,427 and JP08332986A2.

U.S. patent application Ser. No. 09/823,765 overcomes the problems of the above-mentioned prior art. The present application compliments application Ser. No. 09/823,765 by including the most straightforward and safe methods for controlled 90-degree rotation of the handlebars and with optional height adjustability if desired. The handling of the bicycle during the rotation only mode is a simpler process than handling the bicycle in the rotation and fold down options used in application Ser. No. 09/823,765.

II. SUMMARY OF INVENTION

This invention defines a safe manually operated bicycle handlebar steering assembly with optional handlebar height adjustability and with optional storage rotation ability. The system is made safe by ensuring that the handlebar stem cannot be in the rideable position without some form of lock being engaged.

Almost all bicycles currently on the market can be divided into two categories, 1) bicycles using a stem that mounts inside a steerer tube (the upwardly extending straight tube of a wheel fork) using a quill type internal stem, and 2) bicycles using an external stem that clamps onto the outside of a steerer tube at a point just above the headset bearings.

Because there are two different systems used on almost all bicycles, this invention includes embodiments which are compatible with both internal stem bicycles and external stem bicycles. In the case where an external stem is required, the stem can be rotated for storage but is not height adjustable. In the case where an internal stem is required, the stem can be height adjustable, in most cases, or the stem can rotate for storage, or the stem can do both.

In all embodiments herein, it should be noted that the wheel "fork" is integrally made of at least two fork blades, and a "steerer tube" extending upwards through the vehicle frame. There are no embodiments of this invention where the wheel fork does not have a steerer tube. It should be noted that many small wheel folding bicycles use forks which do not have a "steerer tube" extending upwards through the bicycle frame.

A first preferred embodiment utilizes stems mounted inside the steerer tube. The manual height adjustable, internally mounted, steering assembly is primarily made up of three parts, the stem, the collar, and the steerer tube headset assembly. The steering assembly consists of a steerer tube connected to the fork blades and front wheel, wherein the top end of the steerer tube extends through and above the top of the upper bearings to allow it to be fixed to the interior stem. The interior stem generally consists of a vertical member, which rides inside the steerer tube, and a horizontal member which protrudes forwards to connect to the handlebar. The upper end of the steerer tube is fitted with a clamping, or fastening device such as a collar. The collar, in some cases, has one or more bolts, some of which may protrude beyond the inner surface of the steerer tube into a track in the interior mounted stem.

In this preferred embodiment, the stem vertical member is primarily made of a cross sectional shape that is not able to rotate about the steering axis due to a corresponding inner shape of the collar. The rotation process is accomplished by unlocking the collar quick release, turning the protrusion retracting knob, and pulling the stem all the way up to a point where the protrusion is on the round rotation area of the stem and the vertical motion comes to a stop. At this point the shaped stem upper area has left the shaped collar area, and, if the protrusion is held retracted, the stem can be rotated to the storage position and then push all the way down into a steerable storage position. Many other safety options can be built into the riding, rotating, and storage tracks as disclosed in detail in this preferred embodiment.

In other height adjustable, rotatable embodiments, the vertical stem member has either a shape, a round with a shape, or is round with a vertical track or tracks to keep it from rotating. In each case, the collar, equipped with a quick release, is fixed to the steerer tube and has a shape that matches the exterior shape of the stem. In the cases where the collar does not have a matching interior shape, the steerer tube has the matching interior shape and is squeezed onto the stem. After the collar quick release is released, stems with vertical tracks control the vertical movement of the stem. Rotation can occur at either the top or the bottom of the stem in rotation areas or, if retractable, ball bearings or other protrusions are used it can occur at any level.

It is very likely that in many cases, manual height adjustability may be the only desired function and therefore the stem would not allow for rotation about the steering axis.

Collars can be one or two level, and can have either compression collars, as in the preferred embodiment, dimensionally stable collars, using interior compression cylinders, or have a ball bearing locking system. A two level collar can also use a combination of dimensionally stable pressure cylinders and slotted compression systems. Each of these components is shown separately but, for simplicity, the combination is not shown but obvious to those skilled in the trade. The collars can squeeze directly onto the stem, or indirectly onto the stem by squeezing onto the steerer tube which, in turn, squeezes onto the stem. The collars can also squeeze partly on the stem and partly on the steerer tube. Protrusions can be moveable, fixed, and combined with the alignment system. Steerer tubes can be threaded or threadless, with interior shapes to match the stem and exterior configurations including slots, notches and large and small holes to tie to the collars. Alignment can be at the top of the stem, at the collar, or at the steerer tube, fork junction. A two level collar can be configured such that one section is shaped to match a shaped vertical stem section and this section of the collar can rotate relative to the other section of the collar to allow the stem to rotate.

In other embodiments, the vertical and horizontal members of the stem are not integrally connected but rather the horizontal stem member can rotate about the vertical stem member for storage. In some cases, the vertical stem member is fastened to the steerer tube in a manually adjustable manner such that manual height adjustment is done between the stem and the steerer tube while rotation for storage is done between the two stem members. In other cases, the vertical stem member is fastened to the steerer tube with a tool such that rotation is done between the two stem members but height adjustment requires the use of a tool. Also shown are cases where a two part stem is configured such that rotation for storage occurs about an axis other than the steering axis. The restraining device in this case can either be located at the steering axis or at another location. These, and all other embodiments, can be equipped with an option wherein the bicycles can be locked using a standard key lock in a public place with the handlebar rotated such that it cannot be ridden. Alternatively, the vertical stem member can consist of two hinged portions wherein the stem is pulled up such that, when the upper portion has exited the steerer tube, it can be folded down for storage.

For internal stems with height adjustment and rotation, the rotation is always a two step process where the primary locking device is undone and then a secondary function must be performed to allow the stem to be rotated for storage. In many cases a track is used in conjunction with a shape. Tracks can be bumped on the bottom surface whereby a spring loaded protrusion must be continually activated in order to allow for any movement of the stem. The track can also have bumps in only certain sections of the track, for example, when the stem is raised beyond a "minimum insertion line" or when the protrusion is getting near to the part of the track where rotation is possible. In summary, the track can have no bumps, some bumps, or be complete with bumps in all areas such that the user must continually activate the protrusion in order to allow for any motion of the stem. Some configurations of the locking mechanisms ensures that the bicycle can never appear to be in the rideable position with the handlebar stem able to rotate making the bicycle not safe to ride.

In the rotation options where there is no horizontal track, there are two alternatives. The horizontal stem section can be rotated about a non-rotatable vertical stem section using an additional clamping collar connecting the horizontal and vertical sections. If the stem sections are fixed together, the protrusions can be made to be retractable pulling out of the vertical track to allow rotation. All the options which raise or lower the stem can use a wide variety of fixed or retractable protrusions such as one or two protrusions located in the front, one above the other, or two side protrusions in the same horizontal plane. The protrusions can be set above or below or within the compression collars in integral, joined or separate collars which when used work in all different shapes of tracks. Angled or curved tracks can be used to warn the rider that the stem is moving into an area where rotation is possible.

There are a wide range of secondary safety or locking devices shown in the different embodiments. A secondary safety lock is some form of obstacle such that, even if a primary lock is unfastened, the handlebar will still remain loosely fixed to the front wheel. For example, when a shaped stem is used, even if the primary locking quick release is unlocked, the handlebar stem still cannot rotate because the shaped surfaces prevent it. Some secondary safety devices block the access from the vertical track to the horizontal track by blocking the vertical movement of the entire stem using a different lock or obstruction moved by different hand operated control means or by automatic means. With the systems that restricts the access to the horizontal rotation by limiting the vertical movement of the stem, ball bearings work very well. With a stem being pushed all the way down the horizontal track is still not accessible unless a single or set of ball bearing is moved out of way to permit the rotation processes. The blocking ball bearings, unlike various warning devices, cannot be overridden and by-passed unless the surface holding it in position is moved out of the way. Not shown in the Figures are numerous options for providing warnings to the operator that the handlebar stem is approaching a rotatable state. These include a written warning on the stem, a button that makes a clicking sound, a color coded section of the stem that appears when pulled up and other methods obvious to those skilled in the trade.

The primary and secondary restraining devices are shown in many cases, mounted axially around the steering axis. However, both the primary and secondary restraining devices can be located at points other than at the steering axis. Furthermore, a stem mounted to the interior of the steerer tube can be restrained by a exterior mounted restraining device. Alternatively, a stem mounted to the exterior of the steerer tube can be restrained by an interior mounted restraining device.

A second preferred embodiment employs stems mounted to the outside of the steerer tube. Many bicycles today use a different handlebar stem mounting from the traditional quill type stem. These bicycles use a threadless steerer tube which extends above the top of the headset bearings where the stem clamps onto the outside of the steerer tube. It is therefore necessary to include configurations that work with this existing technology.

For external mounted, fixed height, stems of this invention, the stem vertical section is mounted on the exterior of the steerer tube and held fixed by using either vertical or horizontal pressure or a combination thereof. If vertical pressure is used, the vertical section of the stem is squeezed downward onto a rotation restraining shape. The vertical pressure can be achieved using an inside threaded collar on an outside threaded steerer tube, or a outside threaded bolt on an inside threaded steerer tube. The restraining shape has a tooth or notch which projects into a tooth or notch in the vertical stem member. The lower surface of the vertical stem member has a concave or convex surface and the lower collar has a matching concave or convex shape which reduces minute stem movement. The stem is then rotated for storage by first loosening the upper restraining device, and then moving the stem vertically upward such that it clears the rotation restraining shape and can rotate. In some cases, the steerer tube may have a non-round cross sectional shape that does not allow a stem with a matching internal cross sectional shape to rotate unless the stem is lifted above the steerer tube.

If horizontal pressure is used as the primary method to secure the stem to the steerer tube, the vertical stem section is slotted and manually clamped on the steerer tube. In some cases, the stem vertical member may have an inner surface shape that either squeezes onto a corresponding outer surface shape of a steerer tube, or squeezes onto a corresponding outer surface shape of an interior mounted collar which is locked to the outside of the steerer tube.

Secondary locking devices include spring loaded buttons mounted interior to the steerer tube and retractable and non-retractable teeth mounted on exterior collars or to the stem vertical section.

In all cases, where horizontal pressure, or vertical axial pressure is used to secure the riding position, the quick release or tightening nut can be relocked after completing the rotation process to prevent any turning of the stem and to aid in steering the bicycle as it is moved around in the storage position. In some cases because of the safety device pops into the storage position holding it so it is not necessary to relock the quick release.

III. BRIEF DESCRIPTION OF THE DRAWINGS

FIG. 1 is a perspective of the front end of a bicycle with an interior, height adjustable, shaped steering assembly shown in the raised, lowered, and rotated positions.

FIG. 2A is the preferred embodiment showing a expanded perspective of a height adjustable and rotatable, retrofitable steering assembly with a shaped, height controlled internal stem having a tracked rotation area, a dual level fastening collar, where the bottom fastens to the standard threadless steerer tube and the top fastens to the stem. The top level has a retractable protrusion for rotation and height control.

FIG. 2B shows the upper shaped collar section with optional hinged construction.

FIG. 3A is a front view of the stems lower vertical section.
FIG. 3B is a side view of the stems lower vertical section.
FIG. 3C shows section A-A of the preferred embodiment.
FIG. 3D shows section C-C of the preferred embodiment.
FIG. 3E shows section D-D of the preferred embodiment.
FIG. 3F shows section E-E of the preferred embodiment.
FIG. 3G shows section B-B of the preferred embodiment.

FIG. 4A shows the layout as shown on the preferred embodiment.

FIG. 4B shows an alternative layout with blocking holes and ramps.

FIG. 4C shows the same layout as on one side of FIG. 4A, but without a riding track with automatic height control.

FIG. 4D shows a layout with continuous track for riding, cross over and storage with one blocking hole where the riding track joins the rotation track.

FIG. 4E is the same as 4D, but with a blocking object instead of a hole.

Figure 5:
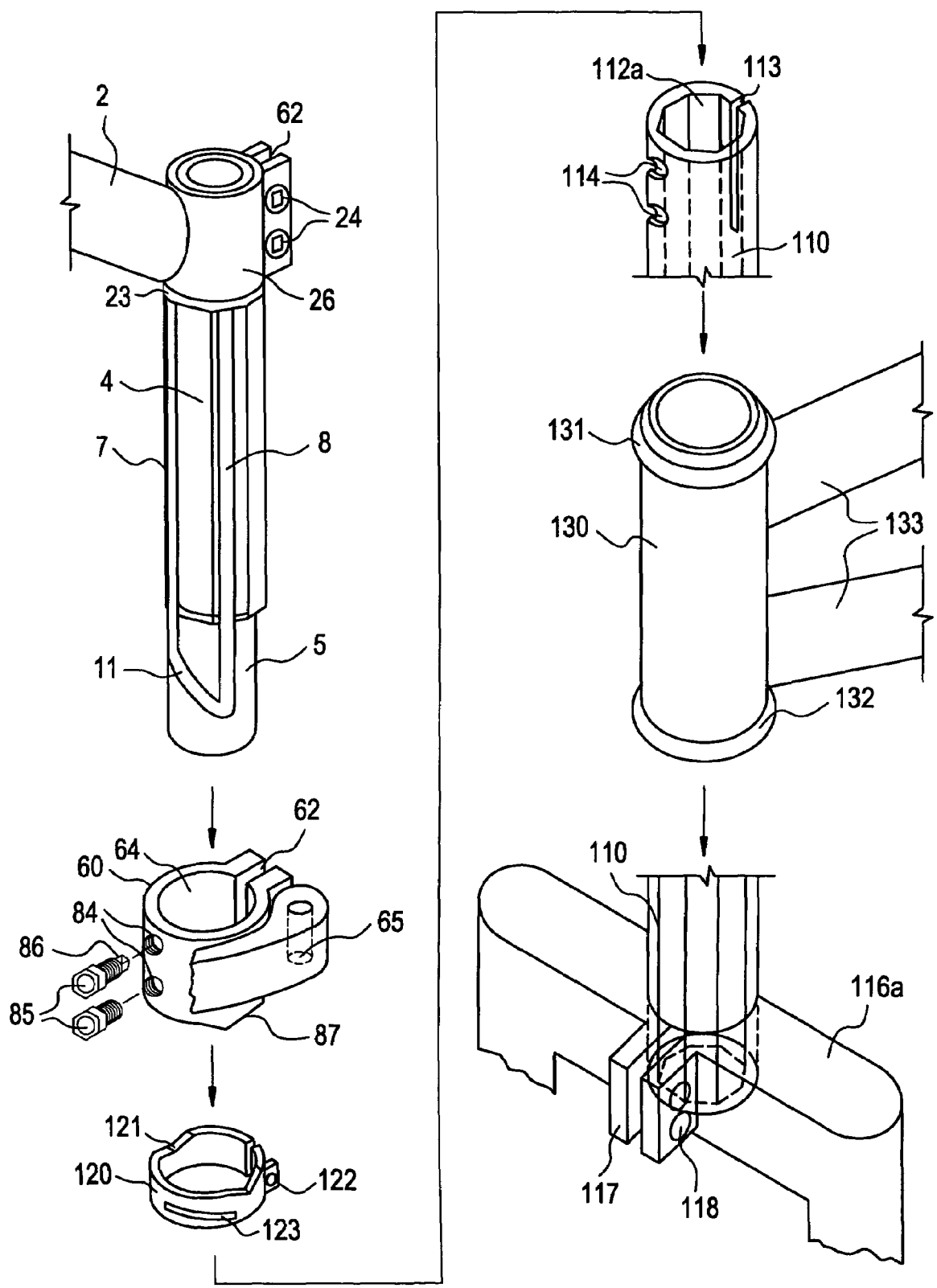

FIG. 5 is an expanded perspective of a height adjustable and rotatable, steering assembly with a shaped and tracked stem, having an angled track in the rotation area, and a two piece stem with a top alignment section. A compression collar squeezes on a slotted interior shaped steerer tube which, in turn, squeezes on the interior stem. The bottom edge of the compression collar is beveled and, when a lower collar with a matching upper shape is rotated, forces the two collars apart thereby applying pressure to the headset bearings. Rotation control is done with a fixed tracking protrusion. A optional bottom front fork alignment between the fork crown and the fork steerer tube is also shown.

Figure 6A:
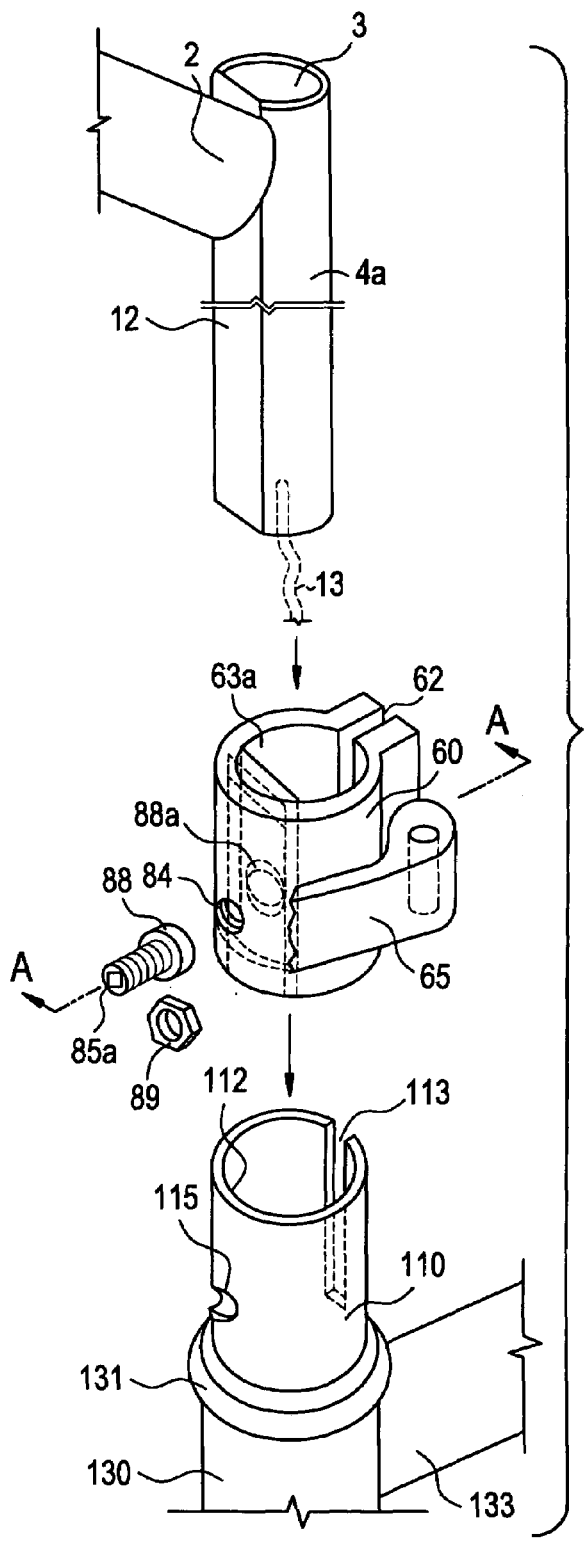

FIG. 6A is an expanded perspective of a height adjustable, non-rotatable, steering assembly with a partially round stem with a corresponding shaped compression collar where the collar resides both on the outside of the steerer tube and the inside of the steerer tube. This collar squeeze both directly onto the stem and onto the slotted steerer tube which, in turn, also squeezes onto the interior mounted stem.

Figure 6B:
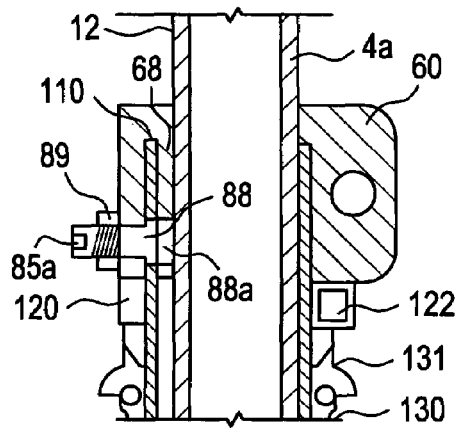

FIG. 6B is a section A-A of a side view showing the single bolt, collar alignment system.

Figure 7A:
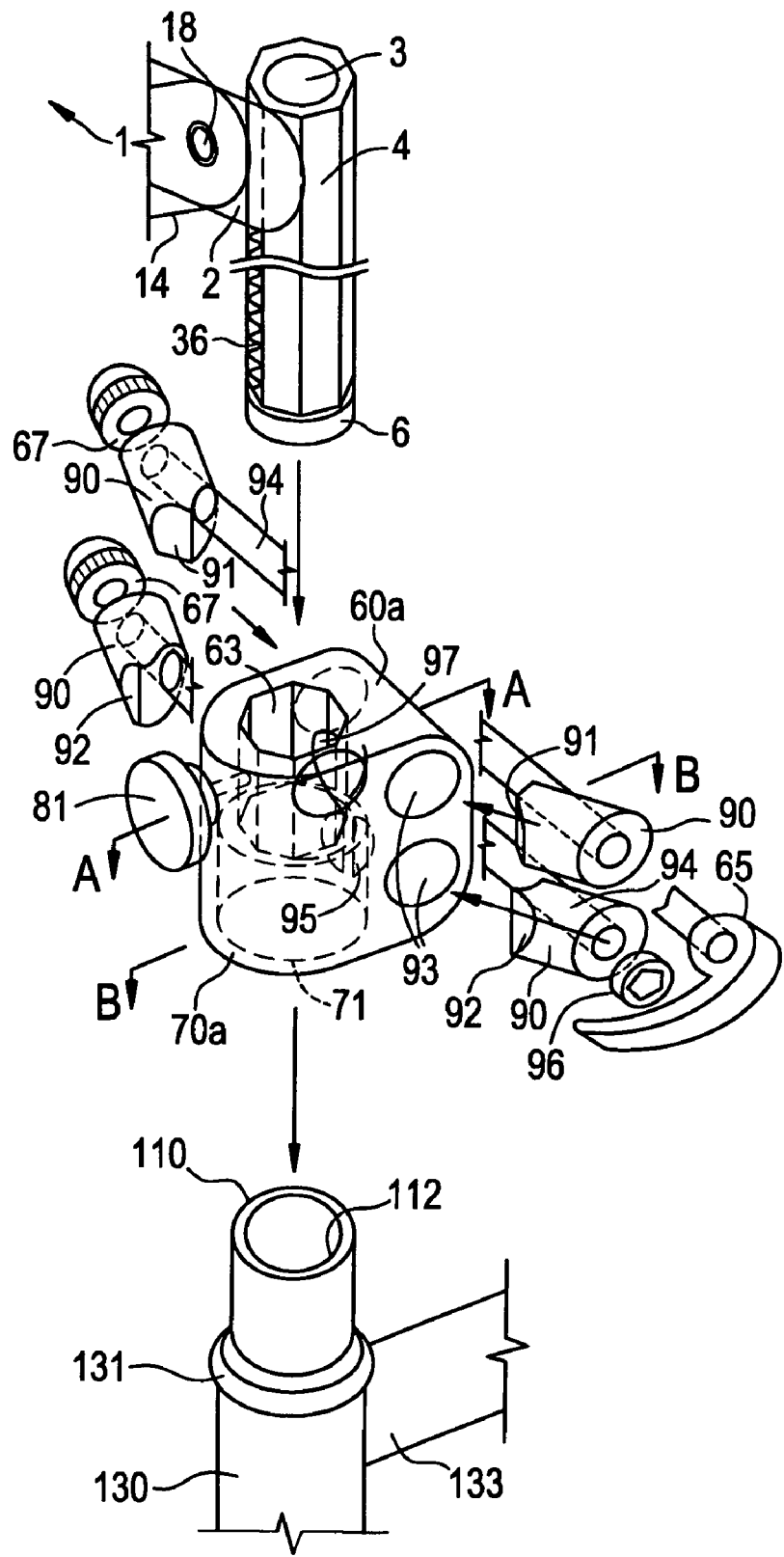

FIG. 7A is an expanded perspective of a height adjustable non-rotatable, retrofitable steering assembly using a shaped, height controlled stem set in a dual level dimensionally stable collar that uses pressure cylinders to fasten to the stem and to the standard threadless steerer tube.

Figure 7B:
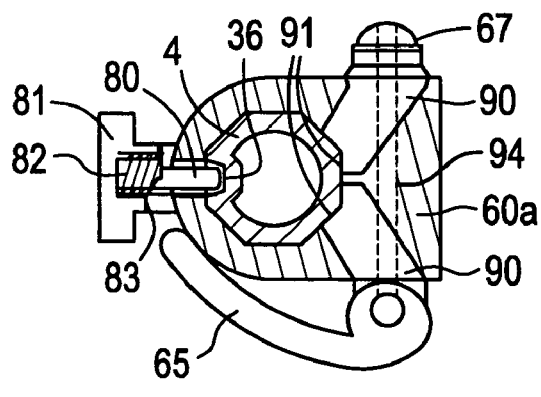
Figure 7C:
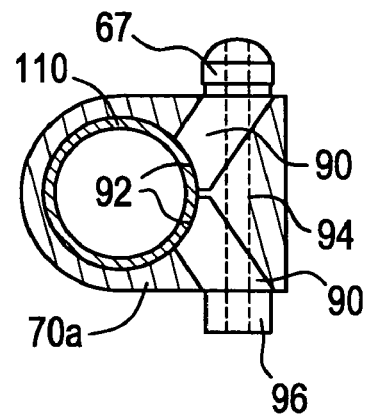

FIG. 7B is section A-A as shown in FIG. 7A. FIG. 7C is section B-B as shown in FIG. 7A.

Figure 7D:
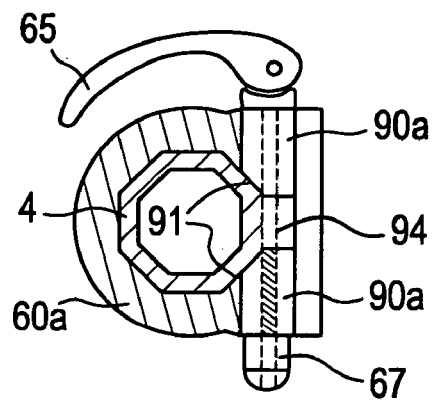

FIG. 7D is a top view section showing a steering assembly using pressure cylinders that move axially with the clamping device.

Figure 7E:
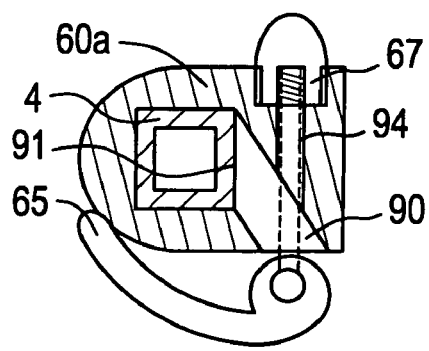

FIG. 7E shows a single sided pressure cylinder.

Figure 7F:
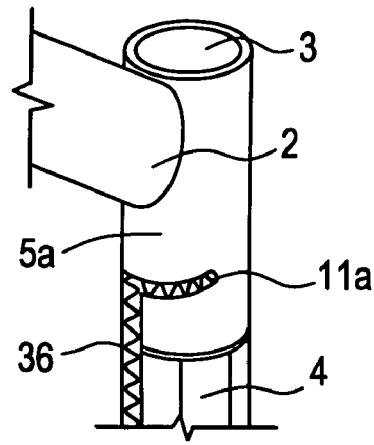

FIG. 7F shows the option of a top cross over area with a rotation track which would allow the steering assembly of FIG. 7A to rotate for storage.

Figure 8A:
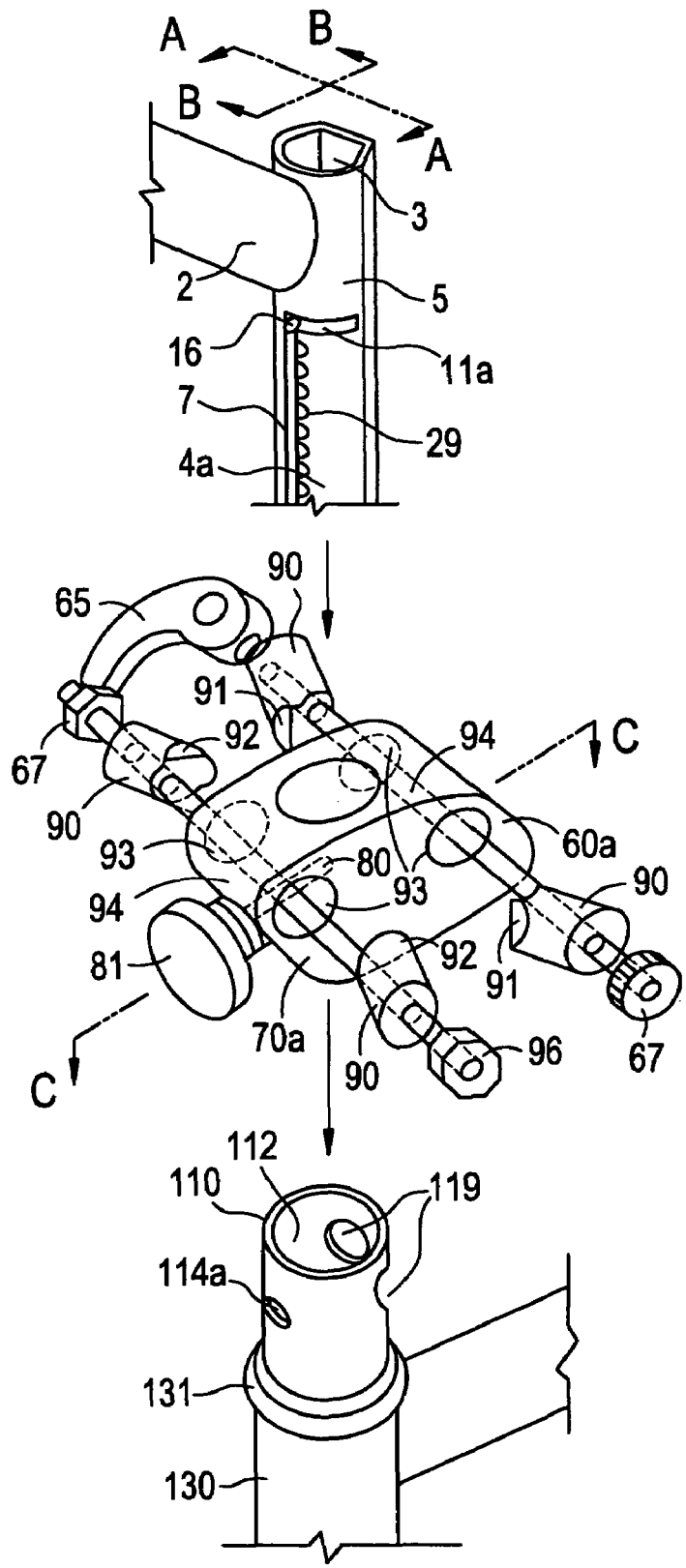

FIG. 8A is an expanded perspective of a height adjustable, rotatable, steering assembly using a round, shaped, tracked, height controlled, stem having an upper tracked rotation area. This stem is set in a single level, dimensionally stable collar that uses pressure cylinders to attach to the stem on one side and uses pressure cylinders to attach to the steerer tube on the other side.

Figure 8B:
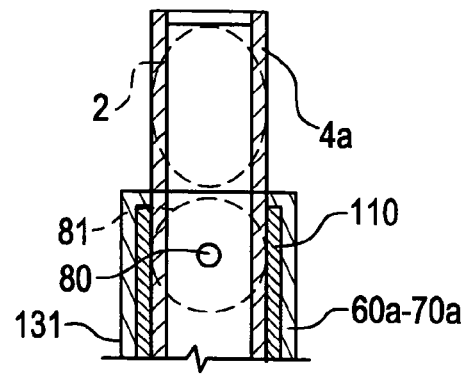

FIG. 8B is section A-A as shown in FIG. 8A.

Figure 8C:
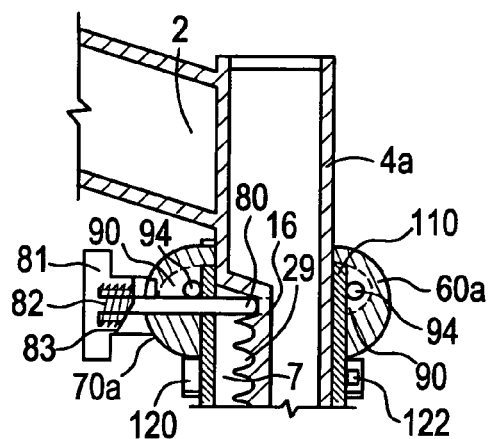

FIG. 8C is section B-B as shown in FIG. 8A.

Figure 8D:
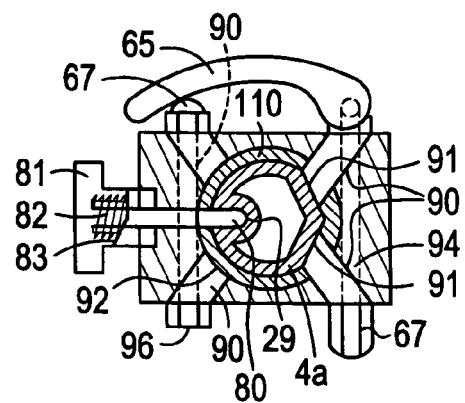

FIG. 8D is section C-C as shown in FIG. 8A.

Figure 9:
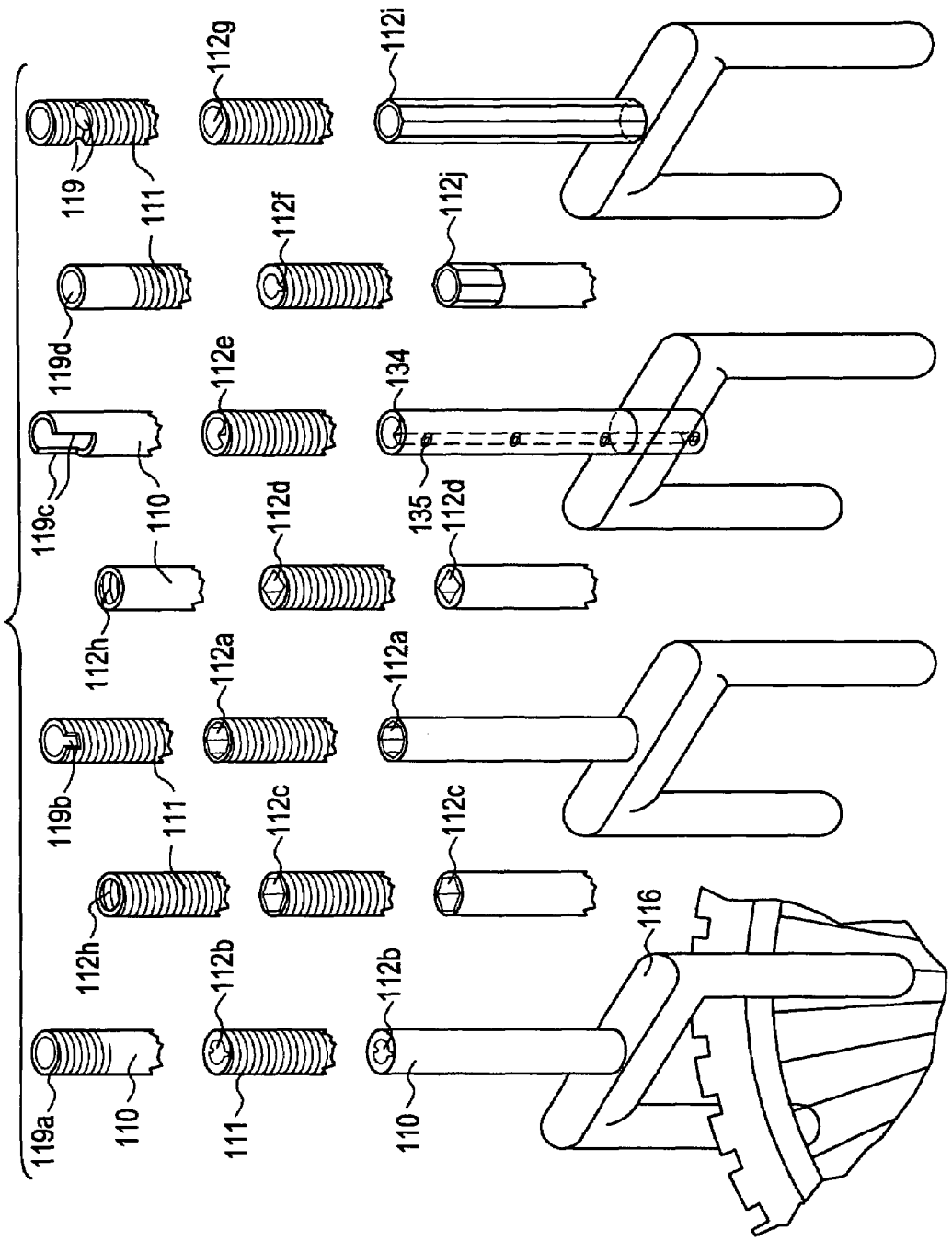

FIG. 9 illustrates different perspectives of the various top configurations, interior shapes, and exterior shapes of threaded and/or threadless steerer tubes.

Figure 10A:
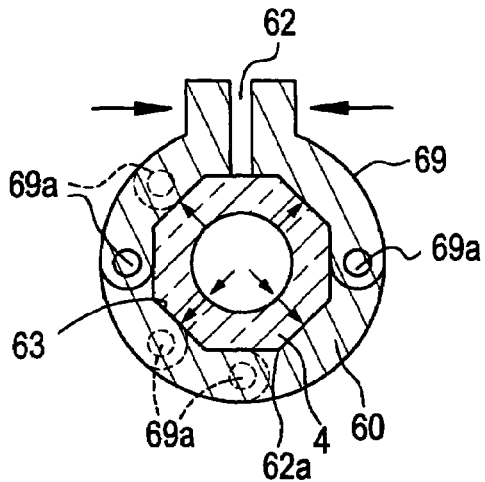
Figure 10B:
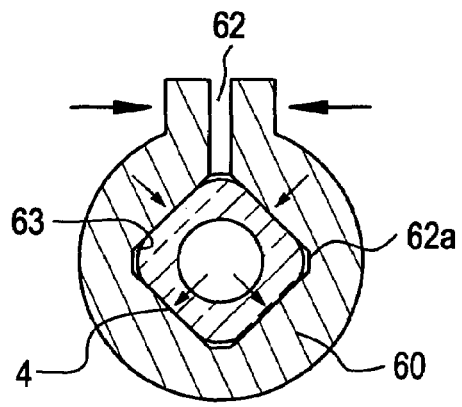
Figure 10C:
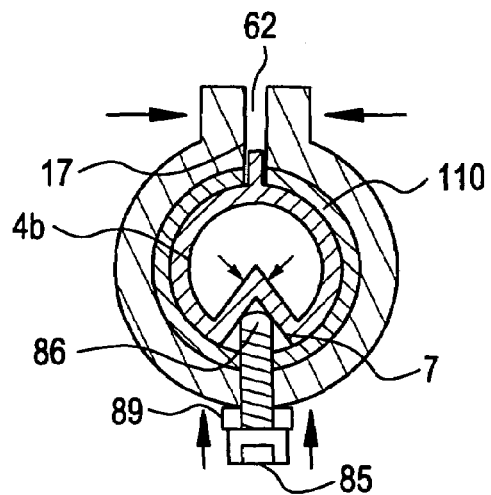

FIGS. 10A-10C are a series of top cross-sections of various compression collars and interior mounted stems showing how collar compression forces are applied directly to their respective shaped interior stems or indirectly through the steerer tube and then to an interior stem. Shown are methods of making shorter and longer sides of octagonal and square stem members to maximize the surface contact between stem and collar. FIG. 10A, also illustrates an alternative with one or more varying hinge points which would generally not effect the force distribution as shown.

Figure 11A:
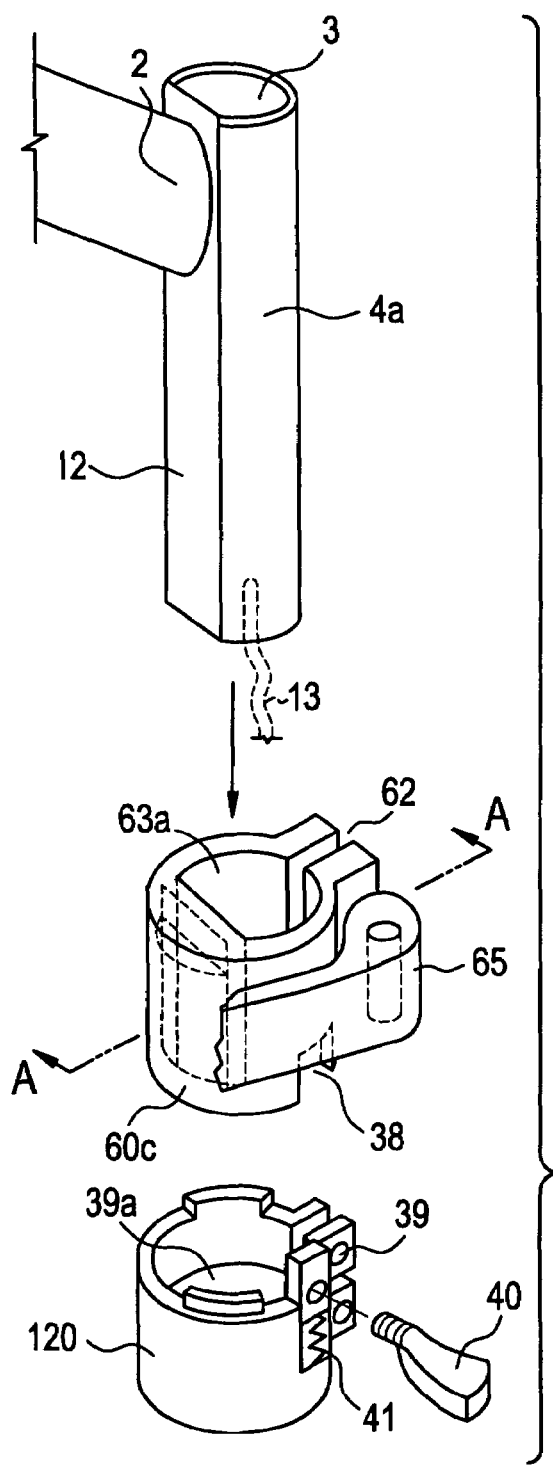

FIG. 11A is an expanded perspective of a height adjustable and rotatable, steering assembly similar to the assembly shown in FIG. 6 except the compression collar is comprised of a lower fixed collar and an upper rotatable collar which, when released, can rotate relative to one another.

Figure 11B:
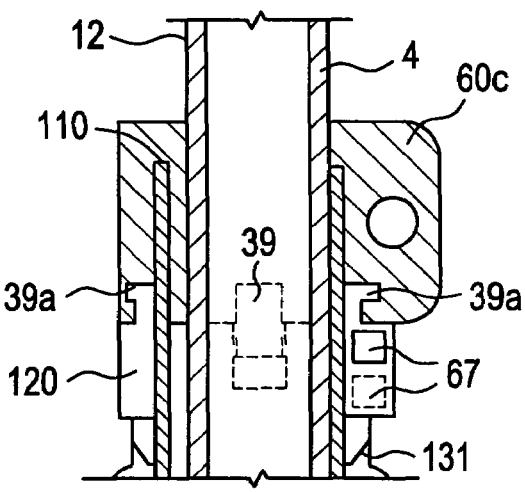

FIG. 11B is side view section A-A and shows the construction of the two interlocking collars.

Figure 12A:
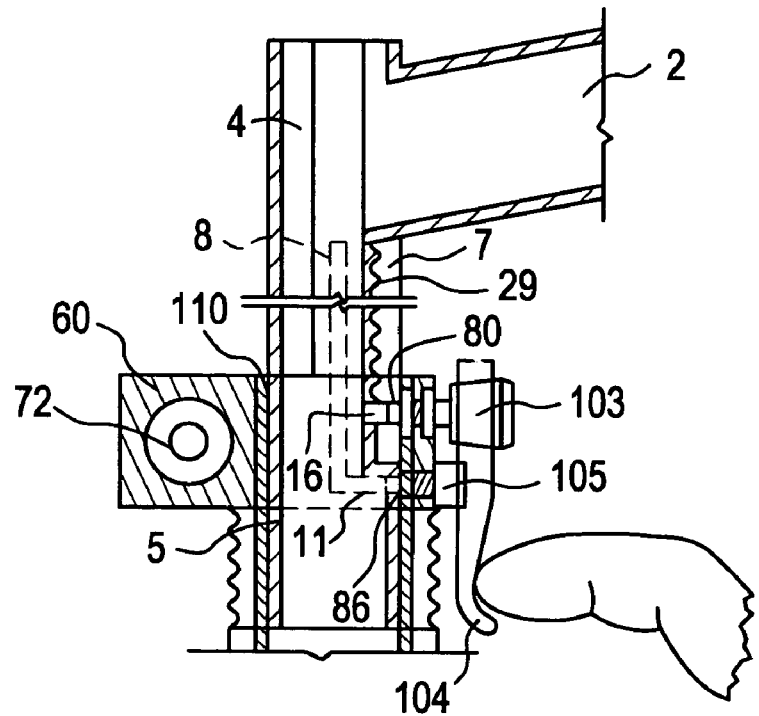

FIG. 12A is a vertical section of a height adjustable, rotatable, round or shaped steering assembly with a stem having a round bottom area for rotation. The stem is set in a compression collar having both fixed and retractable protrusions riding in a single track which controls rotation.

Figure 12B:
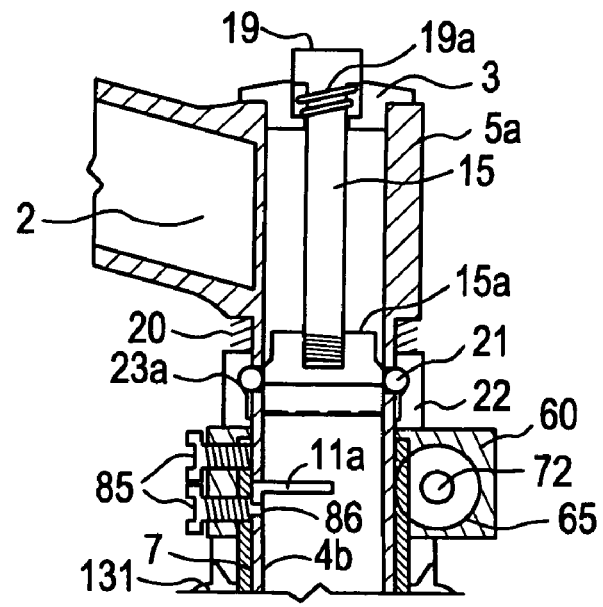

FIG. 12B is a vertical section of a height adjustable, rotatable, steering assembly with a stem having a round vertical stem member with a single track having a top release button controlling access to the upper rotation area with the use of blocking ball bearings. The stem is set in a compression collar having a single fixed protrusion and said collar is set on a steerer tube.

Figure 13A:
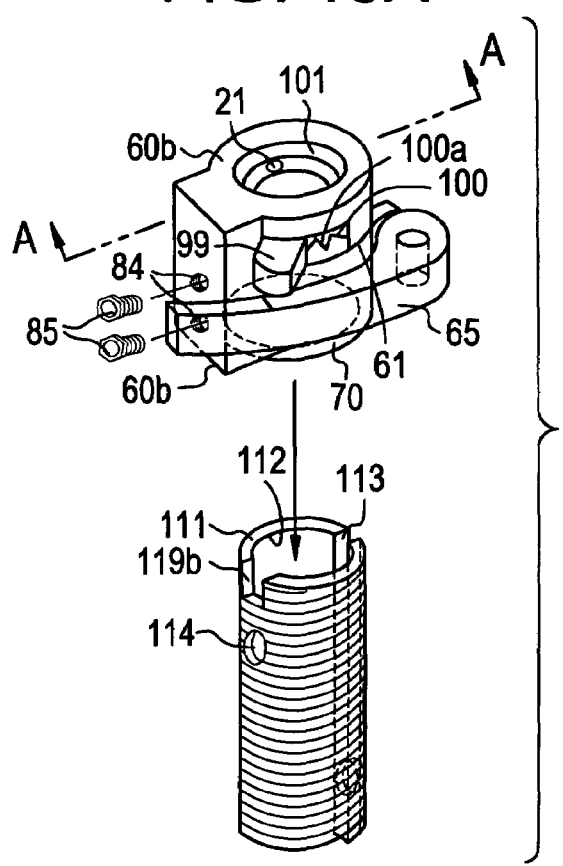

FIG. 13A is an expanded perspective view of a height adjustable, rotatable at any height, steering assembly using a round, four track, stem set in a dual level collar where the top level is a control section using rotation blocking ball bearings with an exterior side control and the bottom level is a threaded steerer tube fastening compression section, set on the threaded steerer.

Figure 13B:
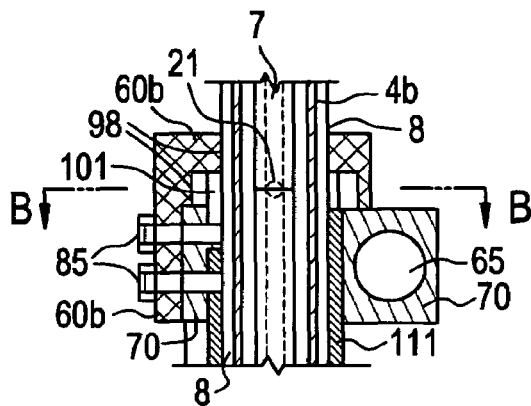

FIG. 13B is section A-A as shown in FIG. 13A.

Figure 13C:
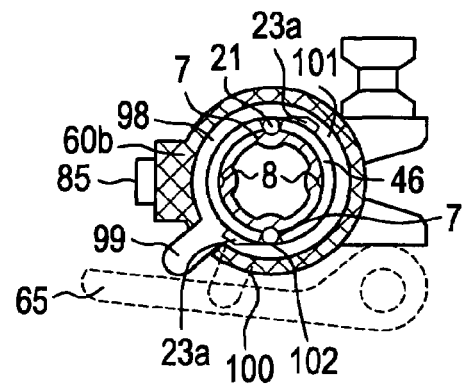

FIG. 13C is section B-B as shown in FIG. 13B.

Figure 14:
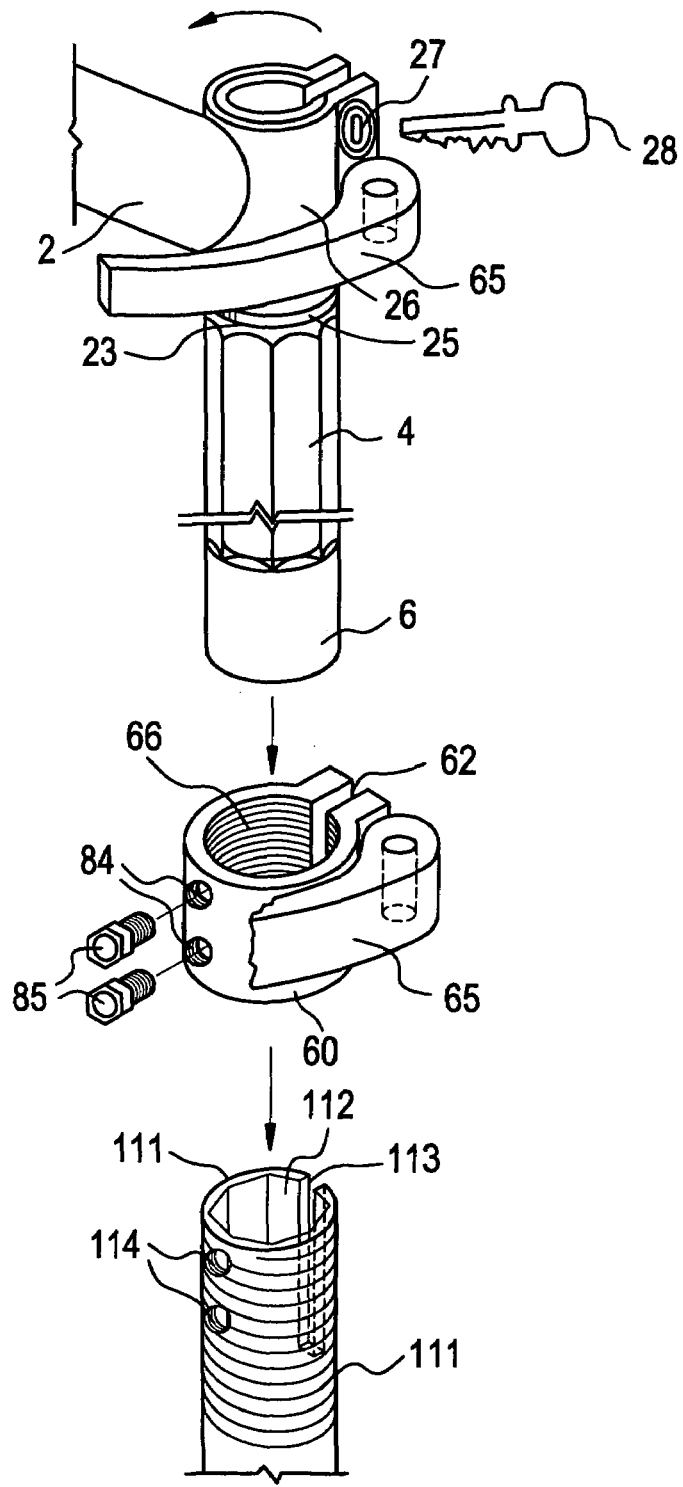

FIG. 14 is an expanded perspective of a height adjustable, rotatable steering assembly where the stem is separated into two parts, a vertical stem shaped section and a horizontal stem rotatable section that allows for rotation for storage or alignment. Shown is a key locking system used to lock the bike in a non-rideable position during storage in a public place. The stem is held by a threaded compression collar coupled with a interior shaped, slotted steerer tube.

Figure 15A:
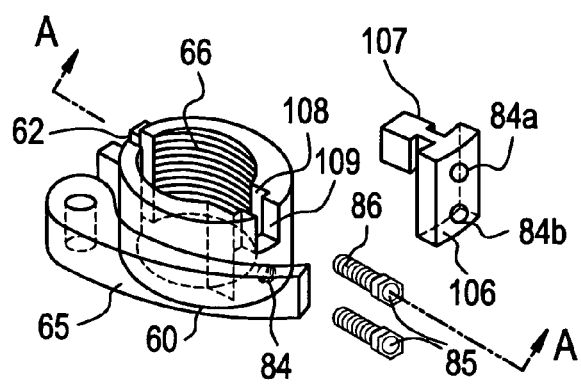

FIG. 15A is a perspective view of a threaded compression collar set on a threaded slotted steerer tube with an alignment attachment shown.

Figure 15B:
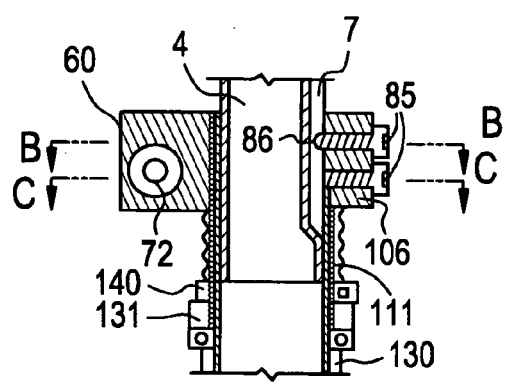

FIG. 15B is section A-A from FIG. 15A with interior, height adjustable stem, steerer tube, and bearings also shown.

Figure 15C:
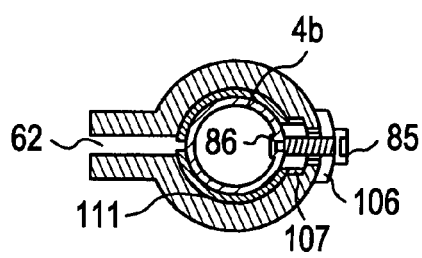

FIG. 15C is section B-B as shown in FIG. 15B through the protrusion bolt.

Figure 15D:
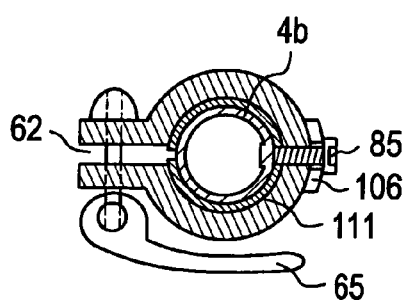

FIG. 15D is section C-C as shown in FIG. 15B through the alignment bolt.

Figure 16A:
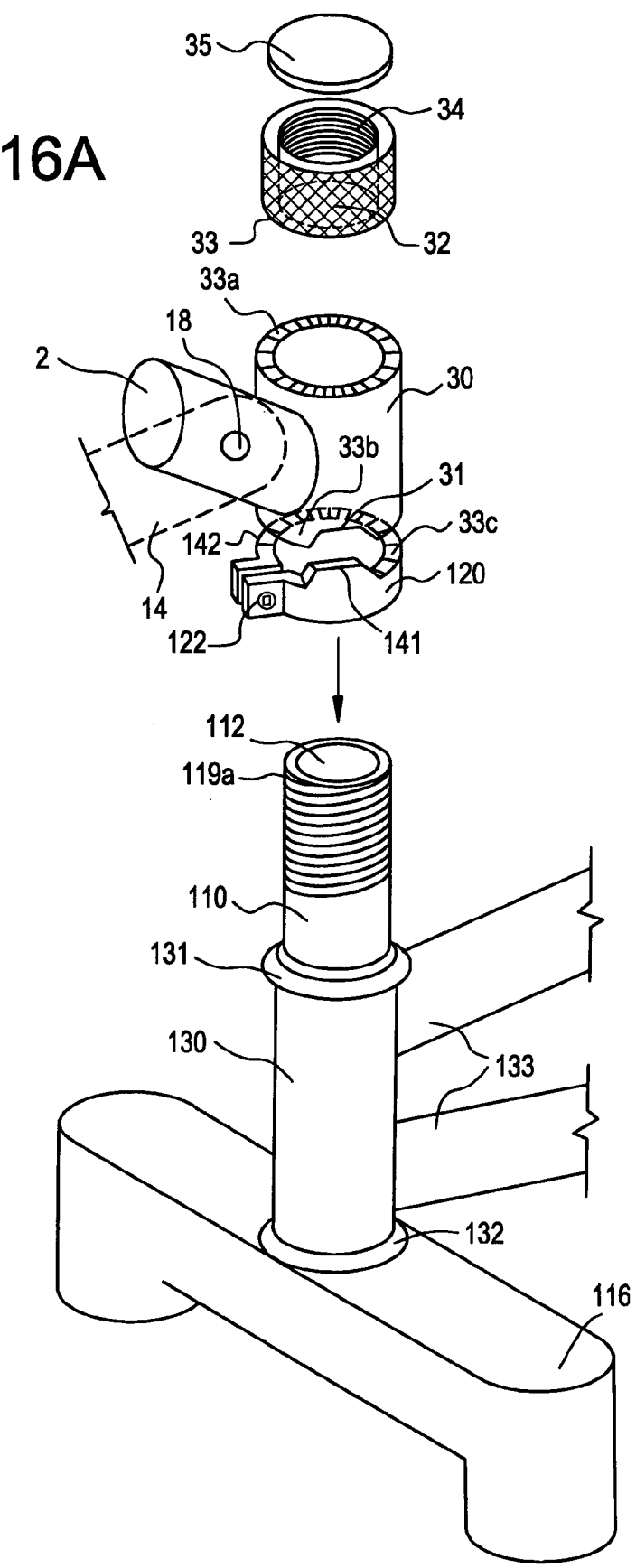

FIG. 16A is an expanded perspective of a non-height adjustable, rotatable steering assembly with an externally mounted stem which is allowed to rotate by unscrewing the top threaded nut, then lifting the stem off the securing notch, allowing it to rotate. This stem section and the locking collar are set on the threadless steerer tube which is threaded on the top.

Figure 16B:
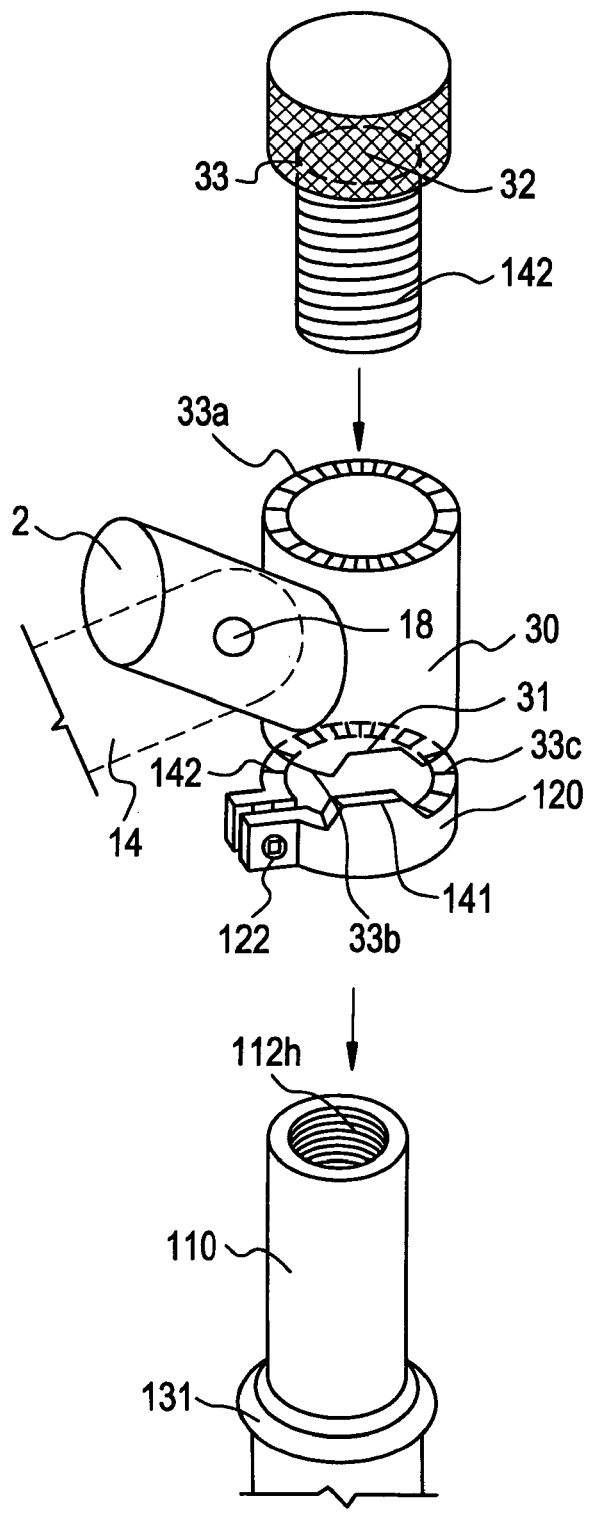

FIG. 16B is an expanded perspective of a of a non-height adjustable, rotatable steering assembly with an externally mounted stem which is allowed to rotate by unscrewing the top threaded nut upward, on the interior threaded steerer tube, and lifting the stem off the securing notch.

Figure 16C:
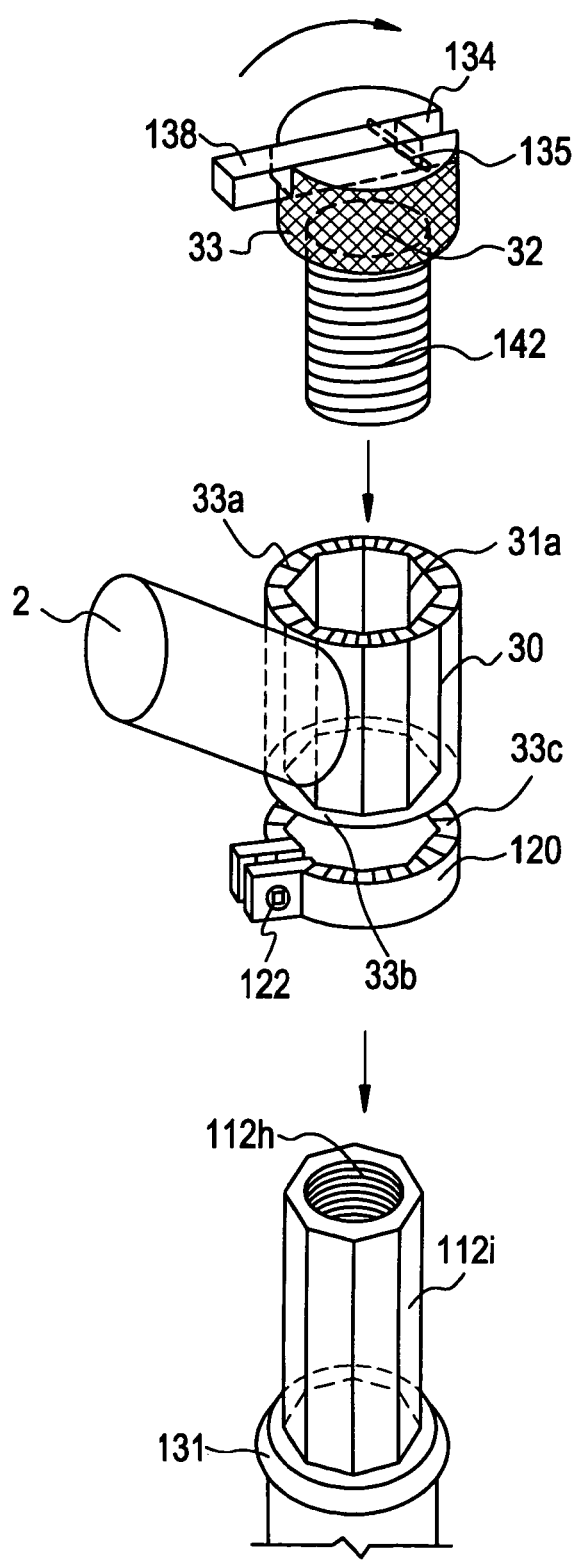

FIG. 16C is an expanded perspective of a of a non-height adjustable, rotatable steering assembly with an externally mounted stem which is allowed to rotate by unscrewing a top threaded nut upward, lifting the interior shaped stem off the exterior shaped steerer tube, allowing it to rotate.

Figure 17:
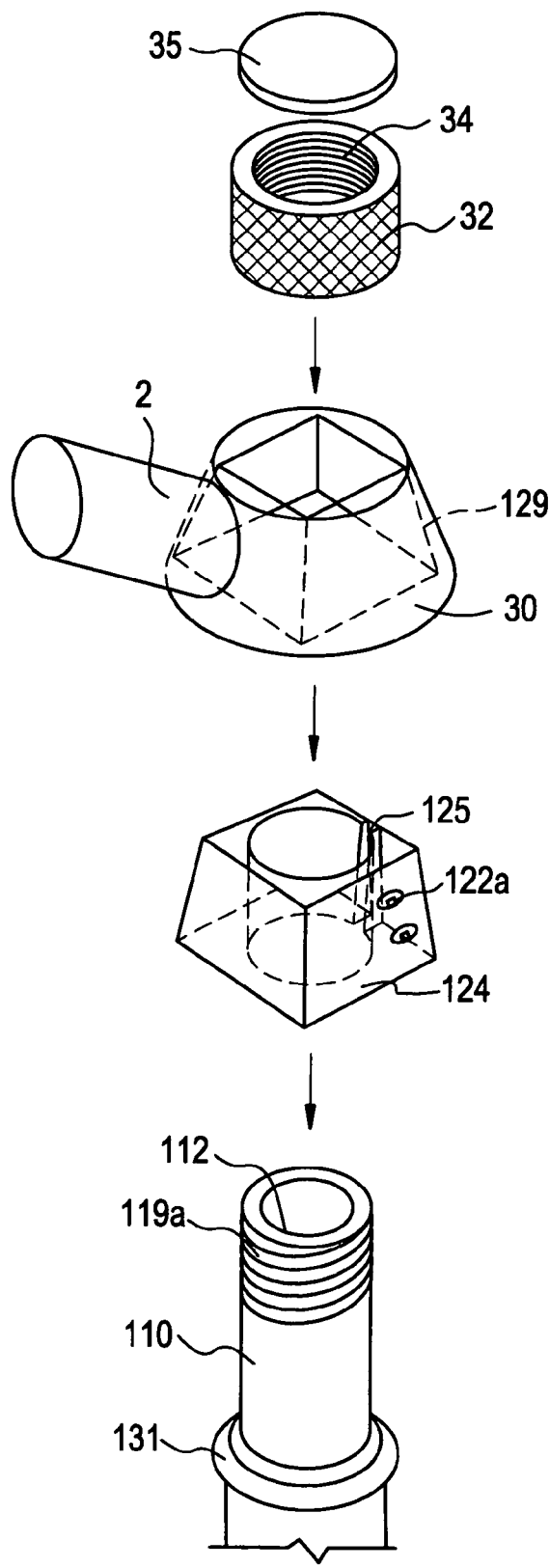

FIG. 17 is an expanded perspective of a of a non-height adjustable, rotatable steering assembly with an externally mounted stem which is allowed to rotate by unscrewing the top threaded nut and moving the interior shape of the stem off a separate shaped collar. This collar is attached to the steerer tube, which is threaded at the top.

Figure 18:
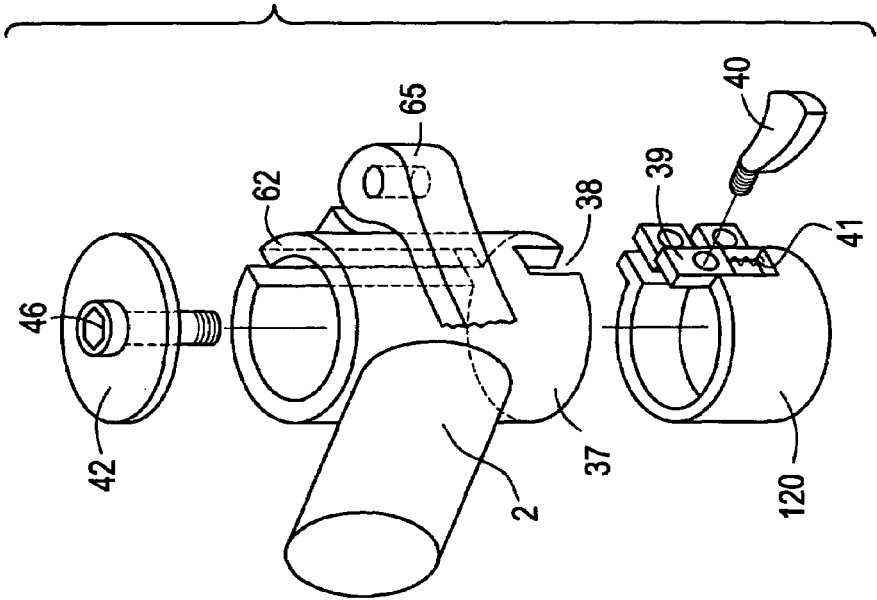

FIG. 18 is an expanded perspective of a of a non-height adjustable, rotatable steering assembly with an externally mounted stem which is allowed to rotate by first unlocking a quick release collar and then lowering a securing flange on a bottom locking collar out of the securing notch on the stem. The rotating stem is held from moving upward by a top cap that attaches to an interior mounted star nut (not shown).

Figure 19A:
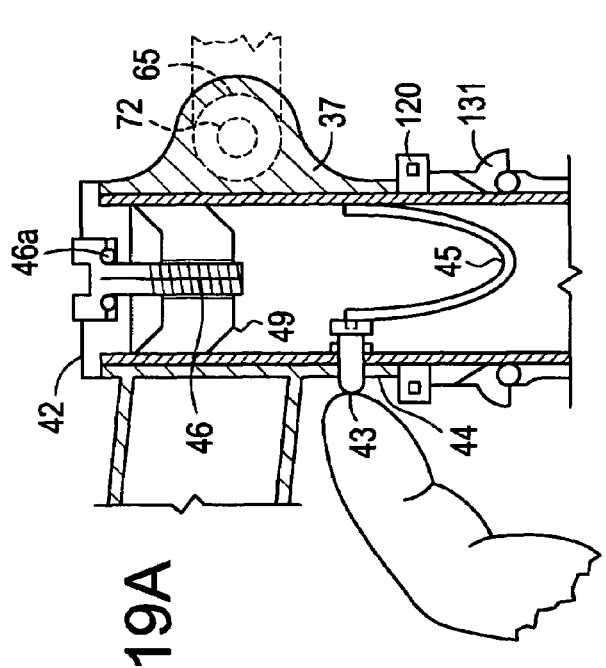

FIG. 19A is a side section of a of a non-height adjustable, rotatable steering assembly with an externally mounted stem which is allowed to rotate by depressing an interior mounted restraining button out of its exterior securing hole. The rotating stem is held from moving upward by a top cap that attaches to a star nut.

Figure 19B:
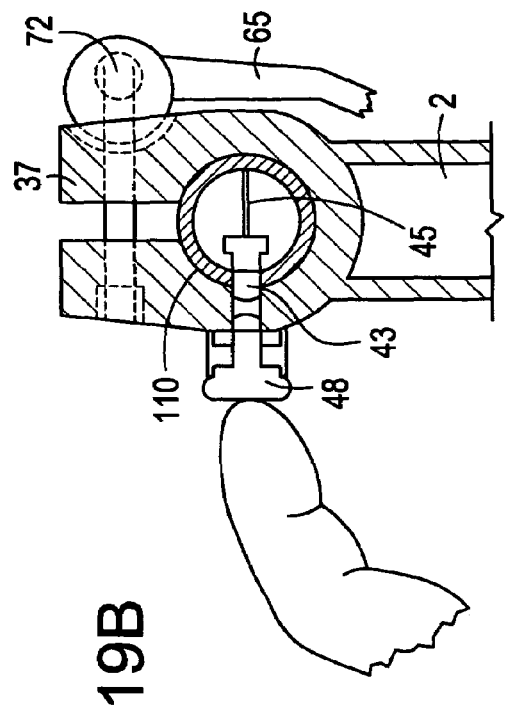

FIG. 19B is a top section of a of a non-height adjustable, rotatable steering assembly with an externally mounted stem which is again allowed to rotate by depressing an interior mounted restraining button out of its exterior securing hole, but this time by using a exterior mounted button which, in turn, depresses the interior mounted button.

FIG. 20A is an expanded perspective and FIG. 20B is side section A-A of a non-height adjustable, rotatable steering assembly with an externally mounted stem which is allowed to rotate by depressing an interior mounted restraining button out of its exterior securing hole into an interior track on the inside of the stem which keeps the stem from lifting off the steerer tube and controls the rotation. Dual threaded, interlocking collars are shown for applying pressure for headset adjustment.

Figure 21A:
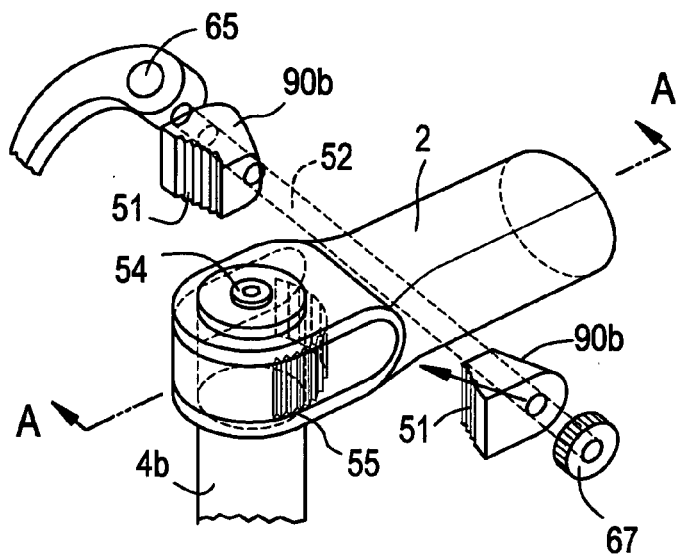

FIG. 21A is an expanded perspective view of a tool height adjustable, rotatable steering assembly with an interior two piece stem having a quill securing vertical stem member which has a deep serrated, top area onto which a dimensionally stable horizontal stem member fits and is locked using pressure cylinders.

Figure 21B:
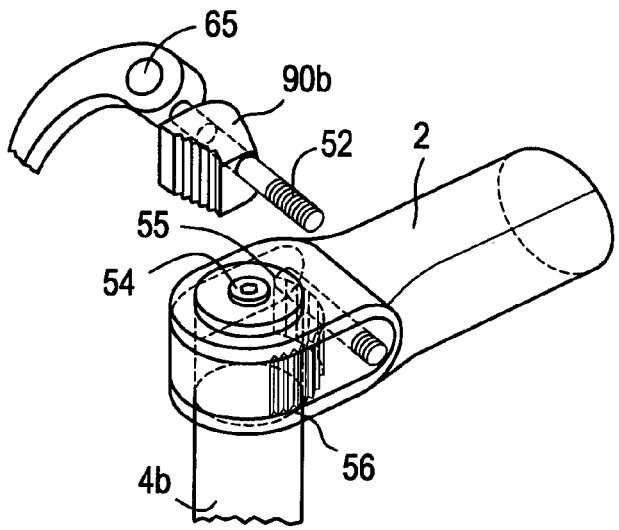

FIG. 21B illustrates the option of a single pressure cylinder system used instead of two pressure cylinders.

Figure 21C:
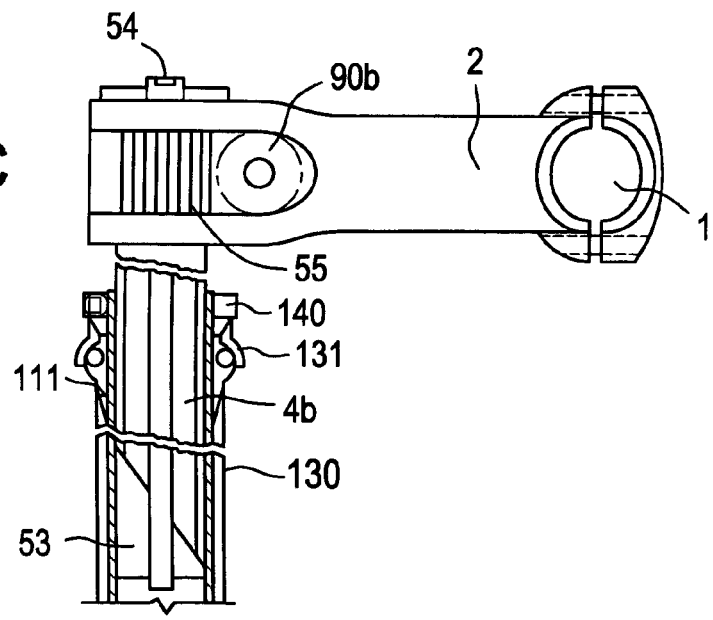

FIG. 21C is section A-A as shown in FIG. 21A.

FIG. 22A is an expanded perspective of a tool height adjustable, rotatable steering assembly with an interior two piece stem having a bottom quill attaching vertical stem member which is capped with a shaped top. The interior shaped horizontal stem member is fixed to the vertical stem member's shaped top during riding and is pulled upward and allowed to rotate when the top threaded nut is loosened.

FIG. 22B is section A-A as shown in FIG. 22A showing the lower quill bolting and upper nut tightening systems.

Figure 23A:
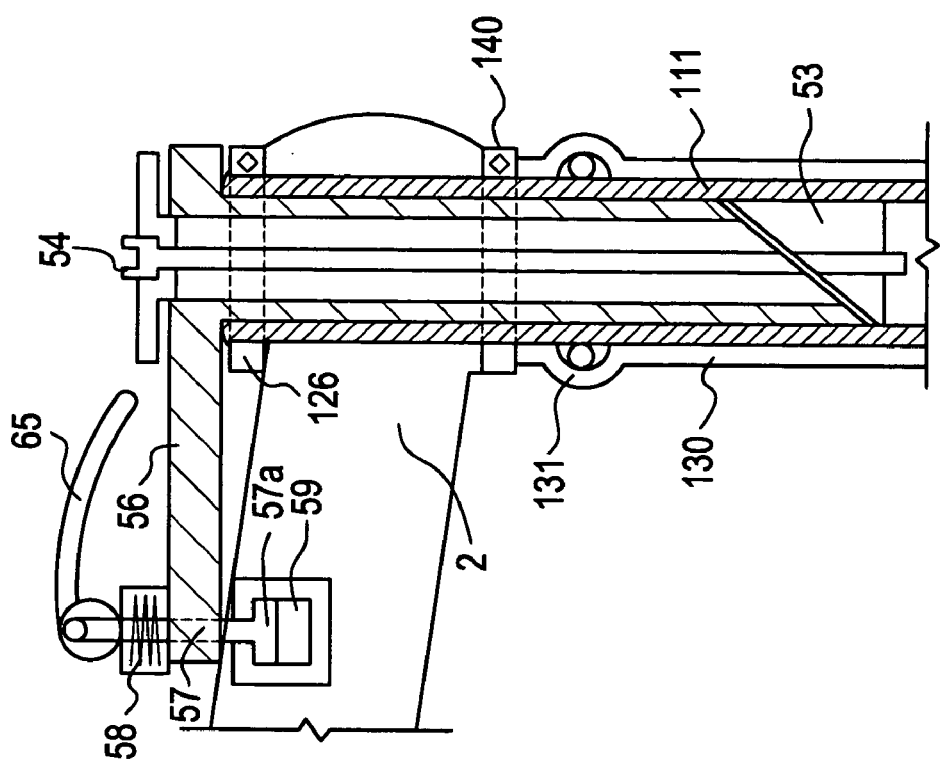

FIG. 23A is a vertical cross-section of a tool height adjustable, rotatable steering assembly with an interior two piece stem having a bottom quill attaching vertical stem member with a top external arm having a fastening point that is not concentric with the steering axis. The horizontal stem member fits concentrically around the vertical stem member and the two members attach together at the fastening point.

Figure 23B:
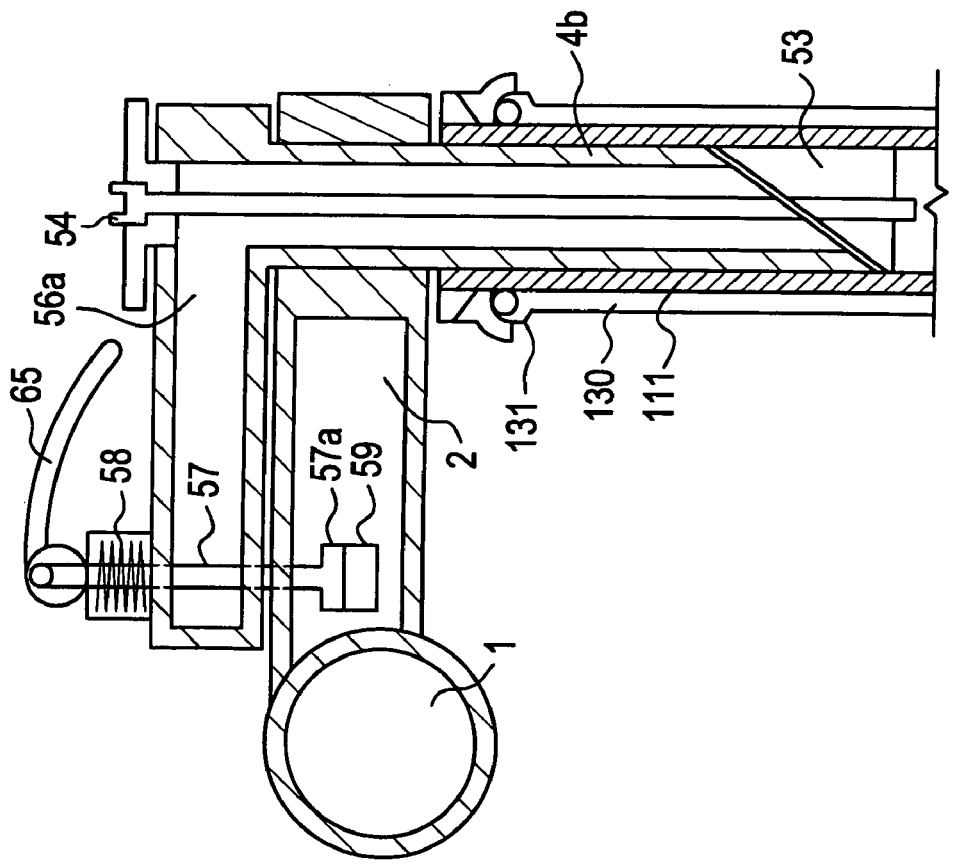

FIG. 23B is similar to FIG. 23A except that it has a non-height adjustable, rotating steering assembly where the horizontal bottom stem member attaches to the steerer tube rather than to the stem and it therefore comprises an exterior mounted stem with an interior mounted fastening system.

Figure 24A:
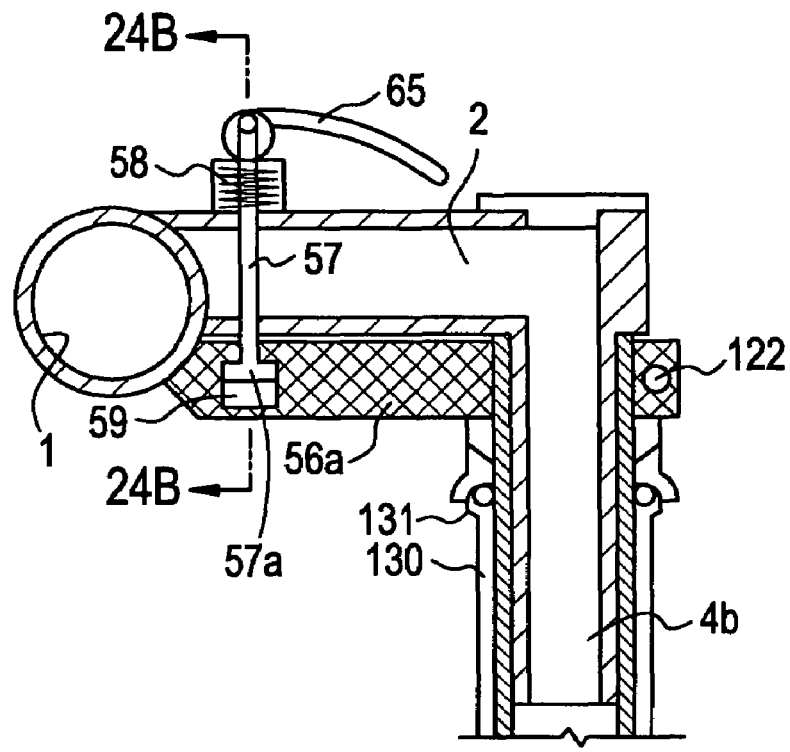

FIG. 24A is a side view of a non-height adjustable, rotatable steering assembly which has an internally located stem, and an external fastening system. The fastening point is not concentric with the steering axis.

Figure 24B:
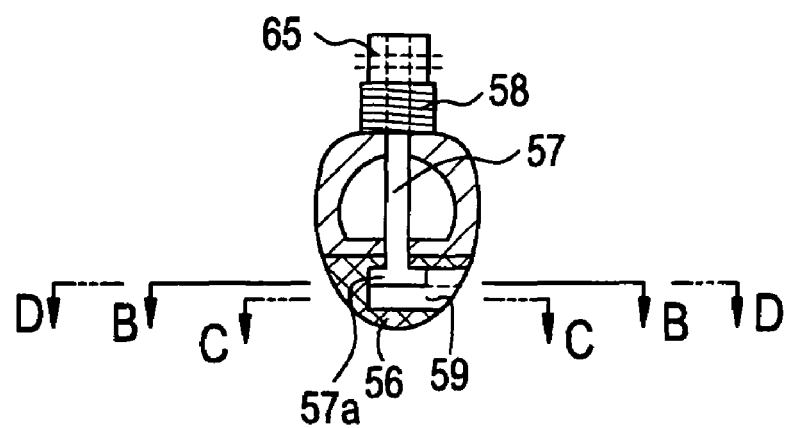

FIG. 24B is section A-A through the locking device of FIG. 24A.

Figure 24C:
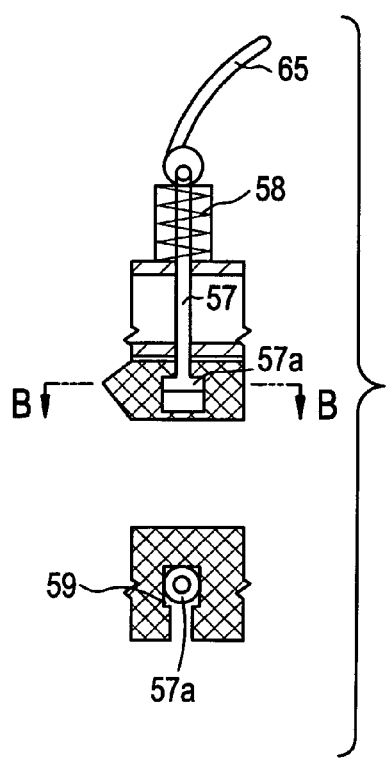
Figure 24D:
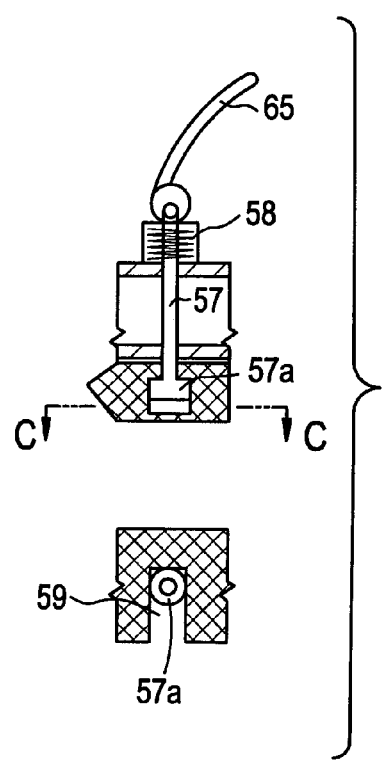
Figure 24E:
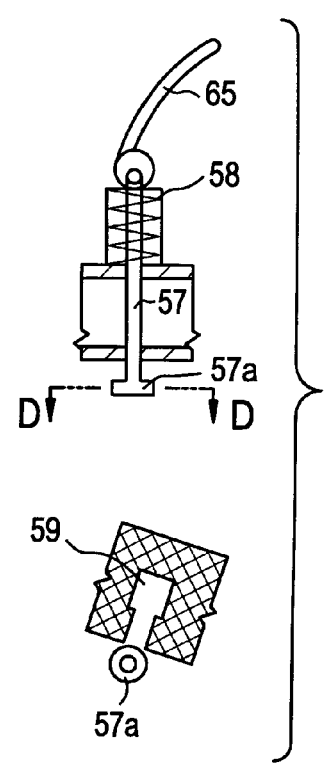

FIGS. 24C, 24D and 24E are side and top sections along section lines B-B, C-C and D-D of FIG. 24B showing the varies stages of releasing the locking device.

Figure 25:
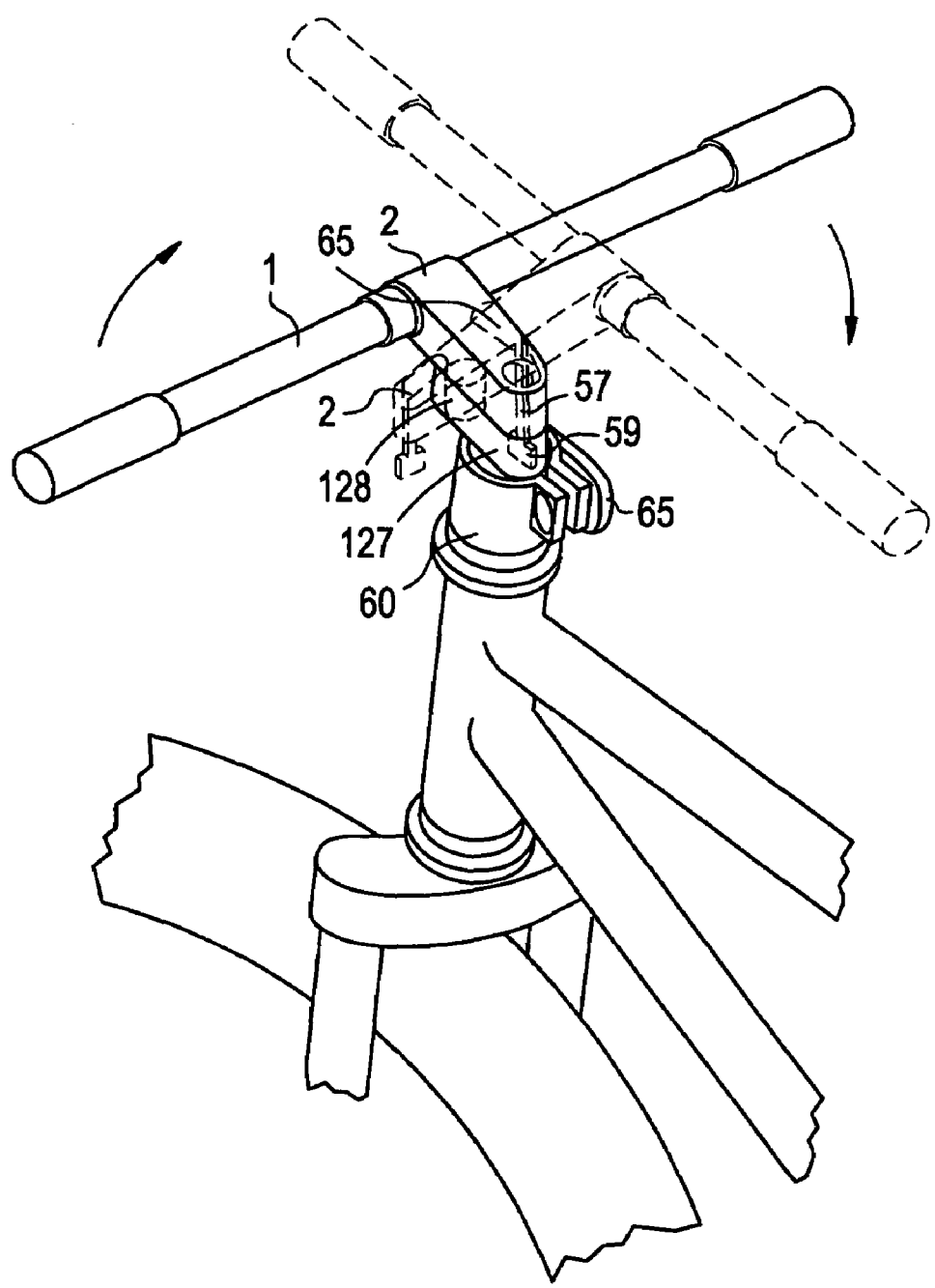

FIG. 25 is a perspective of a height adjustable, rotatable steering assembly which rotates for storage about an axis other than the steering axis and fastens for riding on the steering axis using a locking system similar to that used in FIGS. 23A, 23B, and 24A-E.

Figure 26A:
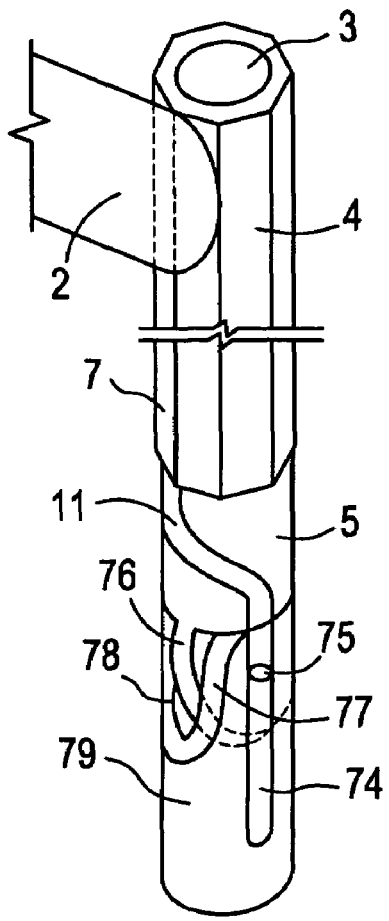

FIG. 26A is a perspective of a height adjustable, rotatable, fold down steering assembly with a shaped and tracked stem, having a downward sloping track rotation area, which leads to a fold down section.

Figure 26B:
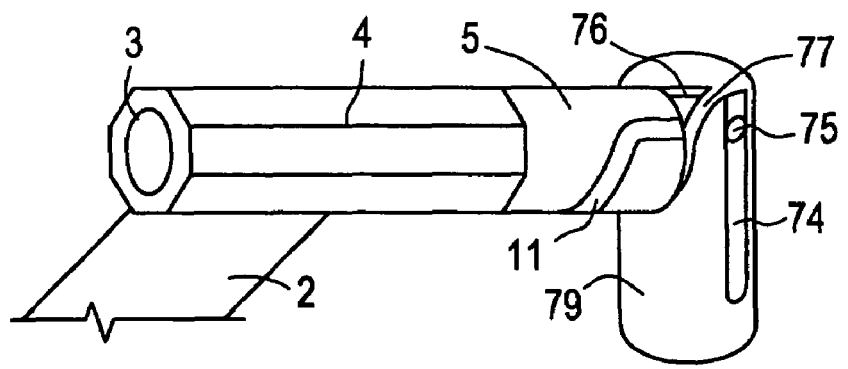

FIG. 26B is a perspective showing the stem of FIG. 26A folded down.

Figure 26C:
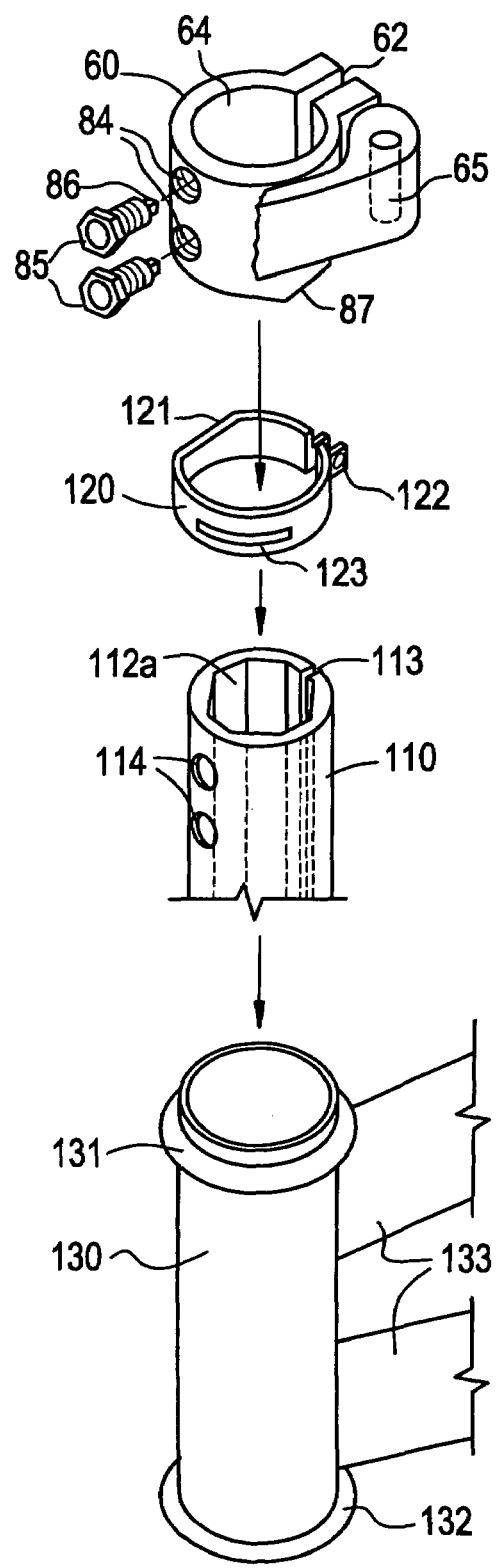

FIG. 26C is an expanded perspective showing the stem of FIG. 26A set in a compression collar which squeezes on a slotted interior shaped steerer tube which in turn, squeezes on the interior stem.

IV. DESCRIPTION OF THE PREFERRED EMBODIMENTS

The steering assemblies of this invention are intended to improve upon existing technology in the two areas—handlebar height adjustability and rotation of the handlebar and stem for easy storage. This invention relates to the method of securing the handlebar stem to the fork steerer tube in a manner that is both safe and convenient for the operator.

This invention comprises a steering assembly where the handlebar stem is manually moveably fastened to the front fork steerer tube using a primary locking device and requiring a secondary action to allow for movement which comprises of either height adjustment, or rotation, or both. In all cases, even if the primary locking device is unlocked, the secondary locking device or function must be performed in order to allow for rotation.

In the figures, the steering assembly use a standard handlebar, usually not shown, a stem which attaches to the handlebar on one end and either mounts inside or outside of a front fork steerer tube with the other. The steerer tube is integral to the front fork and front wheel. The steerer tube is fitted concentrically through the head tube of the bicycle frame and is steerably connected to the frame so that it can be rotated using an industry standard headset bearings system.

The steering assemblies can be generally broken up into two categories. Height adjustable assemblies are shown in FIGS. 1 through 15D, FIGS. 21A-C, 22 A-B, 23A, 25, and 26A-C. Non-height adjustable steering assemblies are shown in FIGS. 16A through 20B, 23B, and 24A-E. Virtually all bicycles currently on the market use either a tool-height adjustable interior mounted steering assembly or an exterior non-height adjustable steering assembly. Therefore it is desirable to have embodiments that mirror these two different categories.

All height adjustable assemblies are interior mounted stems which are comprised of at least a vertical member and a horizontal member. The vertical member is always mounted inside the steerer tube. Within the height adjustable assemblies, there are manually height adjustable systems that allow the rider to raise and lower the handlebar stem assembly without the use of tools which are shown in FIGS. 1 through 15D and FIGS. 25 and 26A-C. These include systems where the handlebar and stem are manually height adjustable and can be rotated approximately 90 degrees for convenient storage using the same quick release locking lever. Shown in FIGS. 21A-C, 22A-B, and 23A are tool-operated height adjustable stems which use a standard quill type attachment method.

In most of the Figures, there is a shape that meets a shape or a track and a protrusion securing the steering assembly from unwanted rotation. In most cases, one shape is part of the stem and the second shape is imbedded in either the collar or the steerer tube, or in some cases is found in the second part of a two part stem.

Steering assemblies shown in FIGS. 5, 6A-B, 8A-D, 9, 10C, 11A-B and FIGS. 12A through 20B, and FIGS. 26A-C use non-standard steerer tubes where the steerer tube is not the standard round, slotted, or has holes, threaded or threadless steerer tube found on bicycles on the market today.

All steering assemblies shown in FIGS. 1 through 22B, FIGS. 25 and 26A-C fasten and unfasten for height adjustment and/or rotation on the steering axis. FIGS. 23A-B, and 24A-E do not fasten on the steering axis but rather fasten at a point offset from the steering axis. While a standard quick release lever is shown in most figures for simplicity, a number of other standard binding methods could be substituted for the quick release, the most simple being a wing nut.

Many different cross sectional shapes can be used to avoid unwanted rotation between the stem and the steerer tube. When rotation is performed at the lower end of the stem vertical member, and it is required that the stem then be able to be lowered in the rotated or storage position, then a cross sectional shape that will fit again after being rotated 90 degrees is required. For example, a hexagon no longer has the same cross section after being rotated 90 degrees. However, a square or an octagon does have the same shape after 90 degree rotation.

FIG. 1 through FIG. 15D show variations of the first preferred embodiment. FIG. 1 through FIG. 4E shows a preferred embodiment which is an octagonal, interior, rotatable, manually height adjustable steering assembly which is retrofittable onto an existing bicycle as it uses a standard threadless steerer tube. The handlebar 1 is not shown but is attached to the horizontal section of the stem 2, which is welded to the vertical, shaped stem section 4, which has a cap 3, and a pull out blocking section 6 which holds the stem in the steerer tube while it is being rotated. This steering assembly is operated by releasing quick release lever 65, rotating turning knob 81, and, while holding turning knob 81 in the rotated position, pulling up stem 4 to the desired height. If rotation for storage is desired, stem 4 is lifted all the way up until the stem turning section 5 is adjacent to the octagonal shape collar 63, controlled with a quick release, where the stem can then be rotated approximately 90 degrees for storage.

As the stem is rotating, retractable protrusion 80 rides along crossover track 11. If desired, once the stem is rotated, it can be lowered with protrusion 80 riding up sloping vertical track 9 and then along the octagonal surface of stem section 4. The octagonal shaped vertical stem section 4 is held within an octagonal shaped top section 63 of a two level collar 60-70. This slotted compression collar works using compression both in its top section and its bottom section. The bottom section, steerer tube restraining collar 70, has a round inner surface 71 used to clamp onto the standard threadless steerer tube 110 to permit it to be retrofitted onto any standard bicycle while the top stem restraining collar section 60 is used to clamp onto the interior mounted octagonal stem 4. In this way, the stem attaches to the collar and the collar attaches to the steerer tube. There is no direct attachment between the stem and the steerer tube.

Regarding safety features, this design offers a very safe system as when the two octagonal surfaces are clamped together, unwanted rotation is not possible. When the stem is raised and the stem turning section 5 encounters the octagonal shaped collar area 63, it could rotate if it were not also equipped with a safety sloping vertical track 9 which does not allow it to rotate. Even when protrusion 80 reaches the bottom of sloping vertical track 9, it cannot enter the crossover track 11 unless it is raised manually by turning knob 81.

As shown, vertical track 7 is equipped with a series of recessed bumps 29 such that, even when quick release 65 is unlocked, stem 4 is restrained from moving relative to stem restraining collar 60 by protrusion 80 which encounters recessed bumps 29 if the stem is pushed in a vertical direction and encounters the side wall of track 7 if the stem is rotated about the steering axis. Safety protrusion 80 is spring loaded and rests extended and engaged against the bottom of the vertical track 7 and against recessed bumps 29. Track barrier 10 prevents the stem from being raised to an unsafe position. Crossover track 11 serves several purposes. First, it does not allow the stem to completely exit the collar. Second, it guides the stem in the rotation process so that it rotates in the correct direction and does not rotate too far—typically 90 degrees.

Once the stem is rotated, it remains tracked until the stem is pushed back down and the two octagonal surfaces meet again. This makes the stem steerable in folded position. It should be noted that, collar 60-70 attaches to stem 4 and attaches to the threadless steerer tube 110, there is no direct attachment between the stem 4 and the threadless steerer tube 110. While it is shown using a threadless steerer tube 110, it can also be mounted to a threaded steerer tube by threading the inner surface of lower steerer tube restraining collar 70. For threadless steerer tubes, a standard "problem solver" inserted wedge nut is used to adjust the headset bearings.

Alignment of the system is accomplished by simply aligning the handlebars with the front wheel, and then locking bolt 73. In the perspective, and in vertical cross-sections A-A (FIG. 3C), C-C (FIG. 3D), D-D (FIG. 3E), and top view sections B-B (FIG. 3G) and E-E (FIG. 3F), the collar is shown with two distinct parts. The top part is the stem compression restraining collar 60, and its compression slot 62, squeezed tight by the quick release bolt 72, and quick release arm 65, with a hand adjustable nut 67, thus forcing the octagonal shaped inside area 63, onto the stem, and with a cut 61 between it and the lower steerer tube restraining compression collar.

In this case, the lower steerer tube restraining section 70, houses a threadless steerer tube 110, which is held by the round inside of the collar area 71, squeezed tight with another compression slot, by a tool tightened bolt 73. Also shown is a perspective of the threadless steerer tube 110, with a round inside surface 112, which is a standard threadless steerer tube integrally connected to front fork 116, and held in the standard bicycle frame head tube 130, which has a standard headset bearing housing and the top bearing 131, and bottom bearings 132, the head tube being connected to the standard bicycle frame tubes 133.

Figure 1:
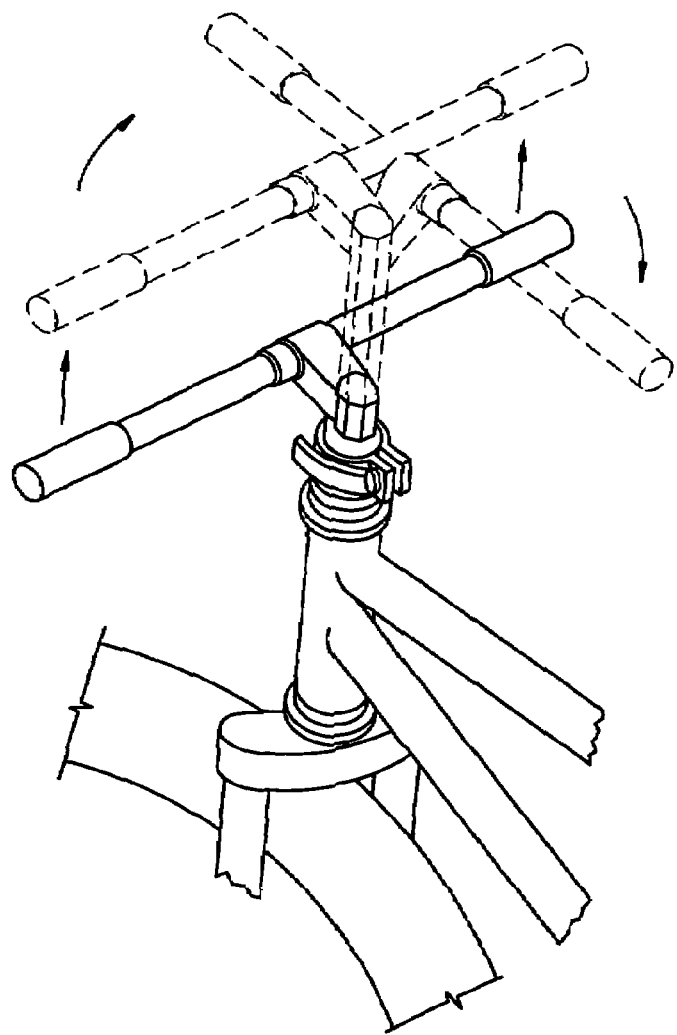
Figure 2B:
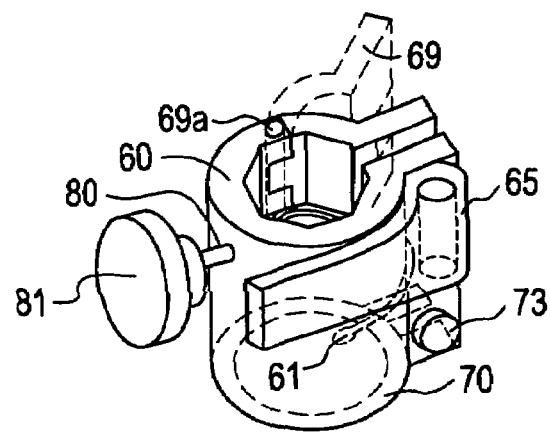

Before the stem is inserted into the collar, it is assumed that a problem solver mechanism with a lower cap 6', would be used within the steerer tube, by pulling downward on the lower part of the stem vertical member to set adjustment of the headset bearings. FIG. 3C, Section A-A shows the protrusion 80, controlled by a turning knob 81, which causes the protrusion to retract and move outward when twisted. This outward motion is produced by the sloping surface 83, and the compression of the inward pushing spring 82. As shown in FIG. 2B the upper compression collar area can be constructed with hinged compression arm 69, rotating about a hinge 69a.

Figure 4A:
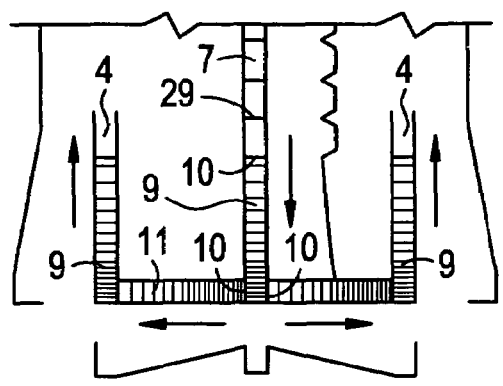
FIG. 4A to 4E show a series of diagrams of different height, rotation, and storage track options for stem movement control.

FIGS. 4A-4E show the various tracking options for controlling access to rotation, for controlling rotation itself, for controlling going to the storage position, and for controlling returning from the storage position to the riding position. The figures show the track, as if it were embedded in a flat surface instead of a round stem surface for clarity. The cross hatched line density shows the depth of the track, as does the section profile line running next to the track. The more dense the cross-hatching, the deeper the track at a given point. In FIG. 4A, starting on the upper end of the middle track, in order to rotate the stem from the riding position, the protrusion follows the arrow downward, off the track 7 with bumps 29, then hits a track barrier 10, and must be retracted upward, then enters the sloping track 9, then down to the bottom, then hits a sideways track barrier 10, and must be retracted upward again, then onto one of two cross-over tracks 11 with a sloping surface, turns and rises up to the storage track and storage position. In this configuration of FIG. 4A, the stem can be rotated in either direction such that the handlebar ends up either on the left side of the bicycle or on the right side of the bicycle. This can be used in any number of configurations shown in this invention. In order to go from the storage position to the riding position in FIG. 4A, the protrusion follows the same path however, in this case it rides up ramps and over the barriers without requiring the retraction of the protrusion.

Figure 4B:
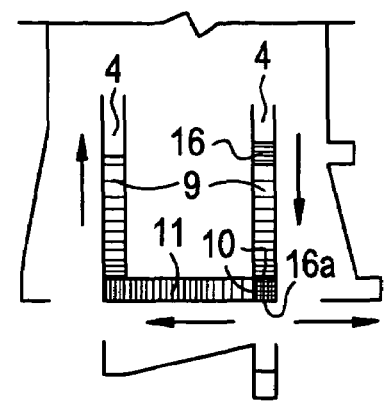

FIG. 4A also illustrates a configuration where there is one long track 7 on the stem 4 and no rotated tracks as the protrusion rides on the surface on stem 4. FIG. 4B shows a configuration where there are no tracks on stem 4, the tracks are only located on stem turning section 5. In order to rotate the stem from riding to rotated positions, the protrusion comes down the right side track, falls into a track hole 16, then must be retracted, then onto a slope and down into a deeper track hole 16a, again pulled up this time a double height, then back down a horizontal slope 11, and up vertical slope 9. In reverse, the protrusion falls into the double depth track hole 16a, when the stem comes to the riding position thereby locking it from any movement both vertically and rotationally, such that the rider cannot get to the riding position without manually retracting the protrusion.

Figure 4C:
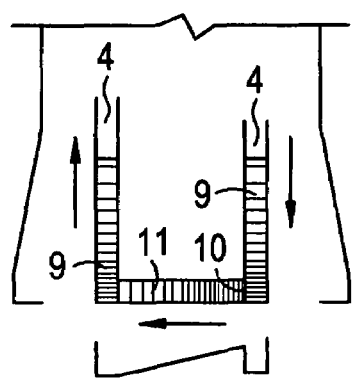
Figure 4D:
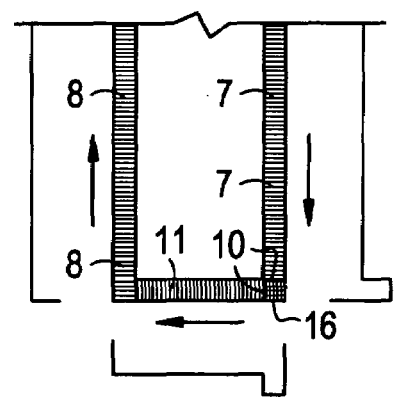
Figure 4E:
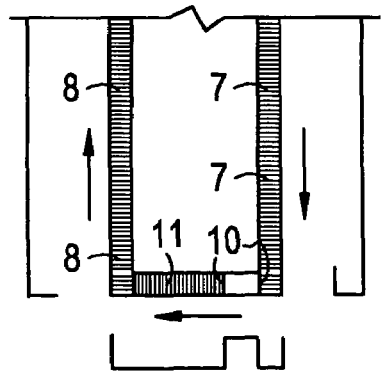

FIG. 4C shows a track system with no tracks on stem 4 where there is one track barrier 10, blocking entry to the rotation track 11, and there are no reverse direction barriers. There can also be riding and storage tracks on the upper stem and a stop on the horizontal section which blocks the stem from the rotation track as well as blocking the stem from reaching the riding track in reverse.

The primary reason to have a tracking system combined with a cross sectional shape such as an octagon, is that, in order to rotate, the octagonal surfaces must be removed from one another and the track becomes the primary safety mechanism at that point. Likewise, the reason to have recessed bumps 29 is so that, even if quick release 65 is forgotten or ignored, the steering assembly will still be functional and not able to rotate or to move vertically unless the rider manually turning knob 81.

These variations on tracking systems can also be used in FIGS. 7F, 8A-D, and 12A, all of which have retractable protrusions. The tracks shown in FIGS. 4A-E show some options for the preferred embodiment. Many other cross sectional shapes as well as many variations of tracks could also work and are not shown for simplicity. Other options not shown but obvious to those skilled in the trade are a system which would rotate when the stem is pushed all the way down with a round rotation section at the top of the stem as shown in FIGS. 7F and 8A. Alternatively, this embodiment could be built without the rotation capability and only with height adjustability. In this case, crossover track 11, and turning section 5 are simply eliminated, as shown in FIG. 7A. In fact, all tracks can be eliminated, as illustrated, for example in FIGS. 6A, 11A and 14. The overall preferred embodiment is shown using a quick release 65, however it is apparent to those skilled in the art that, any number of other standard locking systems could take the place of the quick release. A non-retractable protrusion, as shown in FIG. 5, could be used in place of the retractable protrusion, however a one level continuous, unchanging track would be needed.

FIG. 5 shows perspectives of the octagonal shaped interior rotatable, manually height adjustable stem and octagonal shaped steerer tube which is squeezed with a single level compression collar onto the stem which also has rotation capability. The stem restraining collar 60 squeezes on the slotted steerer tube 110 which in turn squeezes onto interior stem 4. The stem has a front fixed depth vertical riding track 7, connected to a curved cross-over track 11, having a fixed depth downward sloping surface, then on the turning section 5, which in turn is connected to a fixed depth side storage track 8 which allows the bicycle to be steered to a parking spot when the handlebar is rotated for storage.

The perspective of stem restraining collar 60, shows its round inside surface 64, to go around the steerer tube 110 being attached to the front of the steerer tube with two bolts 85, extending through the threaded collar holes 84, on into the steerer tube, the upper bolt having a fixed protrusion 86, extending even farther and into the stem tracking system. In this system, in lieu of the "problem solver" used in the first preferred embodiment, to adjust the headset bearings, the system uses a two-part collar with a top piece, having a lower edge 87, which is beveled to match the beveled top edge 121, of the threadless locking collar 120, shown below it. The top stem restraining collar 60, is locked with quick release 65, then the lower locking collar is turned using wrench slot 123, and secured with locking bolts 122, when the proper pressure is achieved on the headset. The perspective of the round outside threadless steerer tube 110, with the octagonal shaped interior 112a which can be found either just in the upper section of the steerer tube or running all the way to the bottom. The steerer tube 110 has a compression slot 113, and bolt holes 114. This steerer tube extends through the standard headset and frame construction to the bottom section of the steerer tube with its fork 116a, having compression slot flanges 117, with bolts 118.

Since the stem and the steerer tube shapes cannot be turned relative to one another, the alignment must be done, not at the collar, but at either the top or the bottom, in this case both alternatives are shown however only one would be needed. Bolts 118 are used if the fork and steerer tube alignment is used, and if alignment is done at the top, it requires a rotating compression collar 26, riding on a round stem area 23, secured by bolts 24.

Not shown but apparent to those skilled in the trade, is a retractable protrusion replacing upper bolt 85 and 86, which can be retracted out of a hole (located at the intersection of tracks 7 and 11) in the bottom of a fixed depth track but cannot be retracted out of the track itself as shown in FIG. 8A.

Another option not shown is using a single bolt 85 or using no bolts 85 but instead using a protrusion attached directly to the collar and either lapping over the top of the steerer tube or through the slot of the steerer tube. Other options not shown but apparent to those skilled in the trade are a system which would rotate when the stem is pushed all the way down with a round rotation section at the top of the stem as shown in FIGS. 7F, 8A, and 12B. In this case, the octagonal steerer tube inner shape 112a would only be present in the top clamping portion of the steerer tube. The steerer tube shown has a threadless outer surface however, a threaded outer surface could also be used. Many other combinations of stem/steerer tube cross sectional shapes could also be used as well as many other tracking configurations. In some situations, rotation for storage may not be required and this embodiment could be used as a height adjustable stem only by simply ending track 7 short of the bottom of the octagonal shape, or by the elimination of all tracks and protrusions.

It is likely that in some situations, the utility of manually adjustable handlebar stem height will be required independent of the utility of rotation for storage. All configurations shown in FIGS. 1 through 15D can be easily modified to be height adjustable only with no rotation capability. In order to illustrate this invention, FIGS. 6A-B and FIGS. 7A-E, show height adjustable only stems, with no rotation capability shown. FIGS. 6A-B shows perspectives of a height adjustable only stem which uses a single level collar, similar to FIG. 5, except in FIGS. 6A-B, the collar inner surface has a shape and is equipped with an additional piece 68 attached at the top of the collar and located inside the steerer tube. This collar secures the stem by squeezing the slotted steerer tube onto the stem in a manner similar to FIG. 5 as well as squeezing directly on the stem which is not done in FIG. 5.

Figure 2A:
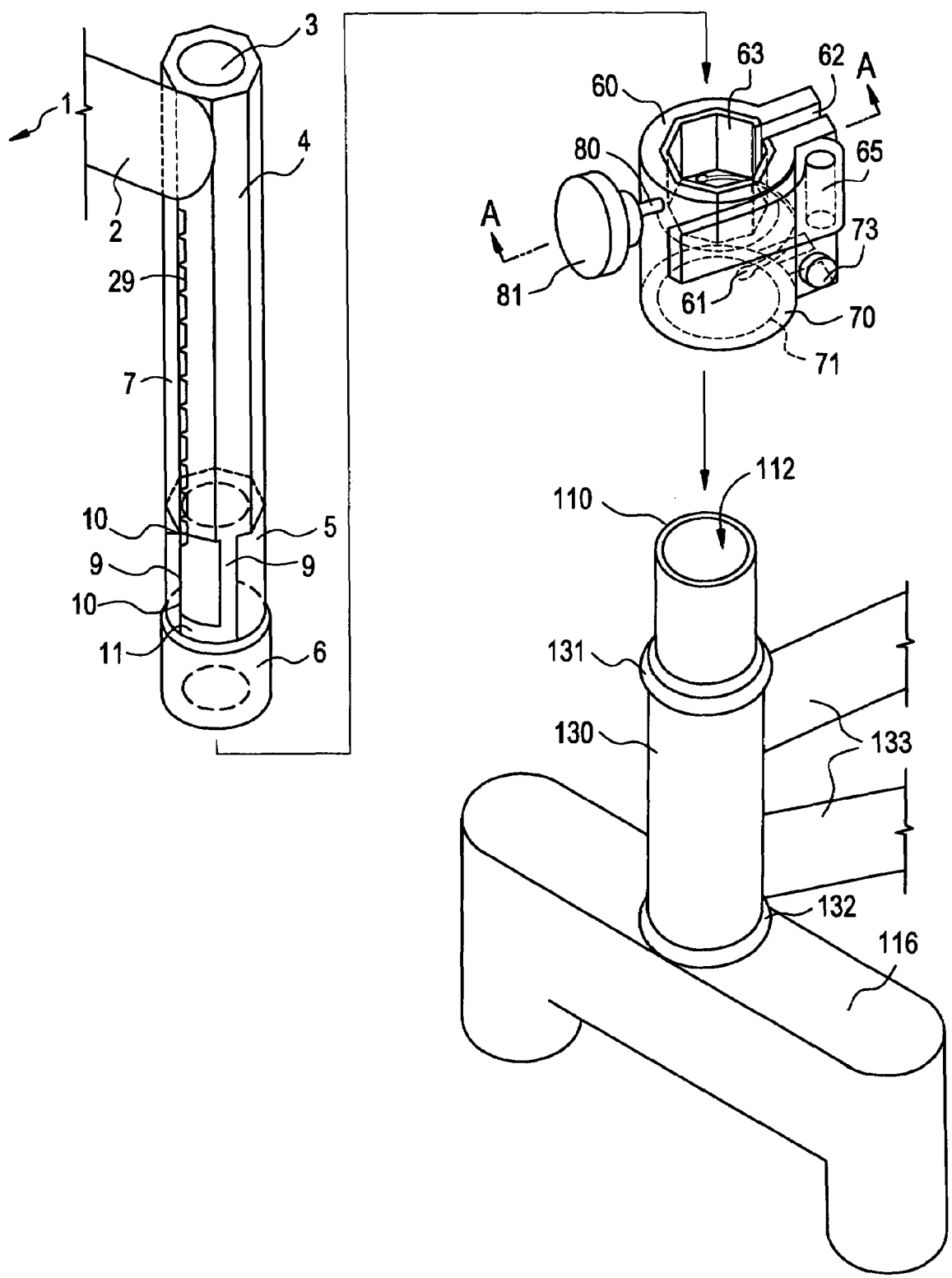

The steerer tube 110 has a round interior 112, like FIG. 2A however, unlike FIG. 5. The cross sectional shape of the round shaped stem 4a, when storage rotation is not required, can be any number of shapes such as the flatted round shown, a pentagon, a hexagon, etc. These shapes do not need to be the same shape after 90 degrees of rotation as is the case with stems which rotate when pulled all the way up like FIG. 2A. A flat front round, shaped stem 4a, with a flat front area 12, is prevented from being raised out of the collar by a restraining cable 13. The restraining cable 13 also is used to avoid allowing the stem to be raised to a level with insufficient overlap of the round shaped stem 4a and steerer tube 110 for safe riding. Cable 13 could be replaced by a simple bolt mounted in the front of stem flat 12.

The flat front collar inner shape 68, inside of the stem restraining collar 60, extends downward inside the compression collar, shown in vertical side section A-A residing inside the steerer tube 110. Again in this case the stem and the collar shapes are form fitting to each other. Alignment is accomplished using the offset position disk 88, shown in the collar perspective and section A-A with the tightening nut 89, which permits the bolt to be tightened onto the threaded holes 84, on the collar thus fixing the positioning of the steerer tube 110 to the stem restraining collar 60. The center of the circle of disc 88 is offset from the center of the bolt 85a. Bolt 85a, is inserted from the inside through the hole 88a, in the inside section 68. The upper part of the steerer tube 110, shows the compression slot 113, and non-threaded large hole 115, to house the offset position disk 88.

Unlike FIG. 5, in FIG. 6A the collar perspective shows the stem restraining collar 60, having a flat bottom edge which would go up against the flat top edge of the threadless locking collar 120, as shown section A-A (FIG. 6B). This configuration, as in the preferred embodiment, assumes the use a "problem solver" type mechanism pulling down on cable 13 for setting the headset bearings. Lower collar 120 is shown in FIG. 6B but not in FIG. 6A. A threaded steerer tube could be used if the inner surface is also threaded. If the stem in FIG. 6A were replaced by a two part stem as in FIG. 5, the stem could be made to rotate within itself for storage. Also, a spring loaded protrusion and a vertical movement track could be used as shown in FIGS. 2A-B if it was required that the stem not be allowed to move vertically without continually activating a button.

Another variation in locking the stem to the steerer tube is shown in FIGS. 7A-E and 8A-D where neither the steerer tube nor the binding collar is slotted, but rather the binding collar is dimensionally stable and is equipped with interior mounted pressure cylinders which lock the collar to the stem and lock the collar to the steerer tube. FIGS. 7A-E shows perspectives and horizontal sections of a manually height adjustable only, octagonal stem steering assembly set in a dimensionally stable two level collar that can be retrofitted onto any standard threadless steerer tube. The perspective of the stem shows the horizontal section of the stem with an adjustable tilting option arm 14, rotating around a pivot point 18, the octagonal stem having a front surface with height control non-recessed bumps 36, and a small pull out blocking area 6 which prevents the stem from being raised to an unsafe level.

The two level, dimensionally stable collar has an upper level 60a which holds the stem, with an interior octagonal shape 63 and a lower level 70a holding the, steerer tube with an interior round shape 71. Within the upper level the pair of interior pressure cylinders 90, with their flat faces 91, are inserted into the collar openings 93, and are poked through the inside opening 97 for the stem, onto the flat face of the stem 4, and are tightened using bolt 94, and the quick release 65 and the hand adjustable nut 67. Within the lower level another set of pressure cylinders 90, with their round faces 92, are inserted into the lower collar openings 93, poked through the inside steerer tube opening 95, and onto the round face of the steerer tube 110, and are fastened using a tool in head bolt 96, attached to cylinder through bolt 94, having a hand adjusted end 67.

Horizontal section A-A in FIG. 7B shows how the pressure cylinders are tightened directly onto the stem 4, which in turn is held against the retractable protrusion 80, held by the twisting knob 81, which is used to control the height adjustment of the stem. Horizontal section B-B in FIG. 7C shows how the lower set of pressure cylinders, independent of the upper set, are tighten directly onto the steerer tube 110.

FIG. 7D, is a horizontal section showing an alternate means of applying pressure onto stem shapes using parallel moving pressure cylinder 90a, as opposed to diagonal moving cylinders as found in FIG. 7A. This straight inward moving system could also be used to secure the steerer tube. FIG. 7E shows another alternate were only one pressure cylinder is used. Clearly any combination of these dimensionally stable means can be used to lock the steerer tube or a stem of any one of a number of cross sectional shapes.

FIG. 7F shows an alternate where the octagonal shaped stem 4 is pushed down and out of the octagonal shaped collar 63 into an upper rotation area 5a so the protrusion 80 is able to line up with the horizontal top track 11a and the stem can be rotated. Since the lower cylinders 90 secure the collar to the steerer tube at any angle, alignment is easily accomplished and requires no additional components. If the lower collar inner surface 71 were threaded, a threaded steerer tube 111 could be used.

FIG. 7A is similar to FIGS. 2A-B in that it uses a octagonal stem, a standard threadless steerer tube, and a two level shaped collar. However, the collar in FIG. 7A is a dimensionally stable collar which does not change in diameter when clamped while the collar in FIGS. 2A-B does change in diameter when clamped. A dual level collar using a combination of a dimensionally stable collar with a slotted collar is not shown but obvious to those skilled in the trade. It is also obvious to those skilled in the trade that the assembly shown in FIG. 7A could be made to be rotatable for storage in a similar manner to that shown in FIGS. 2A-B.

A wide variety of other shapes and/or tracks would also work with the dimensionally stable collars shown.

FIGS. 8A-D show perspectives of a manually height adjustable steering assembly similar to FIGS. 7A-F, however the two levels of pressure cylinders of FIGS. 7A-F have been combined into one single level in FIGS. 8A-D. FIGS. 8A-D shows a part round, part shaped, tracked, stem 4a which can be rotated for storage, where the stem is fastened by a dimensionally stable, single level stem restraining collar where one side fastens to the stem with two pressure cylinders 90 and the other side fastens to the steerer tube using two additional pressure cylinders 90. The perspective of the part round stem 4a shows the vertical track 7, with the bottom height control recessed bumps 29, and an optional rotation control track hole 16, before the horizontal top track 11a. The perspective of the one level stem restraining collar 60a and steerer tube restraining collar 70a shows section 70a, fastening to the steerer tube 110, with round surfaces 92, on the cylinders 90, and stem restraining section 60a, fastening to the stem with flat surfaces 91, on pressure cylinders 90. This single level closeness is possible because the collar is dimensionally stable and the steerer tube 110, with a round interior 112, is heavily penetrated in the back with large openings 119, for the stem cylinders 90 and surface 91.

FIG. 8B is a back view section A-A. FIG. 8C is a side view section B-B. FIG. 8D is a top view section C-C. FIG. 8C, section B-B shows how the retractable protrusion 80, controlled by twisting knob 81, extends through a collar opening just underneath the cylinder through bolt 94, in the front section and, reaches back into the stem track 7. When knob 81 is twisted and retractable protrusion 80 moves outward off the recessed bumps 29, it still cannot move outward far enough to leave the track 7 in order to allow rotation. Rotation is then only possible when the quick release is unlocked and unscrewed such that the pressure cylinders recede, then the tracked stem 4$a$ is pushed all the way down and retractable protrusion 80 is allowed to enter horizontal top track 11$a$. The lower portion of track 7 is not shown but stops at a point such that the end of the track encounters retractable protrusion 80 and does not allow stem 4$a$ to be raised to a position that is unsafe for riding.

Alignment is accomplished simply by loosening pressure cylinder 90 with round faces 92, aligning the handlebar, then tightening them again. Large opening 119 and large hole 114$a$ are slightly oversized to accommodate for small alignment adjustments. As shown in FIG. 8A, the assembly requires a number of redundant steps to be taken to allow for rotation, a) unlock quick release, b)retract and hold the protrusion, c) adjust the height to a specific level, and d) unscrew the quick release to retract pressure cylinders.

It is possible that four redundant locks is an excess, and it is obvious to those skilled in the trade that any combination of these four redundant fastening devices is possible. Not shown but also apparent to those skilled in the trade is a round tracked stem 4$b$, and corresponding collar with the cylinders 91 set to accommodate the round stem.

Not shown is an additional interior mounted spring and button as shown in FIG. 19A which would be, this time, mounted on the inside of the stem 4$a$, positioned so that when the stem is raised, it would pop out, through the steerer tube and collar so as to not allow the stem to reach the rotating position. This interior stem, side mounted button would have to then be depressed by a finger so as to clear the inside of the steerer tube, thus permitting the stem to be farther raised and then rotated.

This invention relates to the method of securing the handlebar stem to the fork steerer tube in a manner that is both safe and convenient for the operator. Simply fastening a round collar quick release on a round stem does not adequately secure the stem from unwanted rotation given the wide variation of operators. Therefore having a shape or a track in the stem and a corresponding shape or track in either the steerer tube or the collar, ensures that unwanted rotation will not occur even if the primary lock is not operated properly. The concept of including a shape in the fork steerer tube inner surface which marries to the corresponding shape in an interior mounted stem is novel and possible in many configurations.

FIG. 9 shows partial perspectives of optional non-standard novel steerer tubes, as a incomplete sample, having non-standard heights, non-standard interior shapes from round threaded on the inside 112$h$, to notched inward and outward 112$b$, to hexagonal 112$c$, to octagonal 112$a$, to square 112$d$, to round notched inward 112$e$, to round notched outward 112$f$, to round with a flat cut off 112$g$. These interior shapes and the plain round shapes could have top sections with threadless tubes having a threaded top 119$a$, notched tops 119$b$, large portions missing 119$c$, threaded tubes having a non-threaded top 119$d$, and/or large openings 119. All of the mentioned options could be provided with threaded exteriors, partially threaded exteriors, or threadless exteriors and be provided with or without slot cut depending on how they are used. All members could also have varying exterior shapes such as element 112$i$ or element 112$j$. Not shown, of course, are the standard height, round, steerer tubes used in the preferred embodiment and FIG. 7A. Not shown for simplicity, are the corresponding interior mounted stem members as well as the exterior stem members. In addition, it is obvious to those skilled in the trade that a collar attached to the upper surface of a round steerer tube, could also have any of these interior shapes.

To secure the stem to the steerer tube, a number of different cross sectional shapes can be used, some of which are shown in FIG. 9 on the interiors of steerer tubes. In some cases, it may be required to have the shape integral to a collar rather than to the interior of the steerer tube. Many other cross sectional shapes can be used in addition to those illustrated.

FIGS. 10A-10C show some examples of cross sections of shaped collars and internal stems and how forces are transmitted between them. FIG. 10A shows and octagonal stem and octagonal collar where the shape of the octagonal stem is made such that some sides are shorter than other sides, allowing for pressure to be applied to four sides of the octagonal surface rather than three. This is accomplished by making the stem surface immediately adjacent to small gap 62$a$ longer than the two stem surfaces next to it, thereby forcing a small gap 62$a$ to form and ensuring that the two surfaces next to it are in contact with the collar. Also shown in FIG. 10A are several locations for hinge 69$a$ which can either be a single hinge or a double hinge breaking the collar into two or three pieces. FIG. 10B shows a square stem 4 with corners cut off so forces are applied on the flat surfaces. Space 62$a$ in this case is found at the corners. FIG. 10C shows a different configuration with stem restraining collar 60 squeezing onto slotted threadless steerer tube 110 which, in turn, squeezes onto interior stem 4$b$. Fixed protrusion 86 is adjustable and the end is round such that there is no micro-movement when the collar is squeezed shut. Stem 4$b$ also shows an optional protrusion 17 extending into slot 62.

In all previous configurations, every steering assembly which is able to rotate for storage, requires that the stem be adjusted to a particular height where the two shapes of the stem and the collar or the stem and the steerer tube no longer prevent rotation. In addition, the collar has, in all previous figures, been fixed to the steerer tube. It is possible that a collar that is rotatable relative to the steerer tube could be required. FIG. 11A shows stem and collar perspectives and FIG. 11B shows side vertical section A-A of a height adjustable, interior, rotatable at any height flat front round stem 4$a$. The stem has a flat front area 12, which is prevented from being raised out of a two part collar by a restraining cable 13. The upper rotating stem restraining collar 60$c$ with a flat front shape 63$a$, is able to rotate relative to the lower threadless locking collar 120. The lower fixed threadless locking collar 120, has a locking flange 39 which is spring loaded by spring 41, and resides, when the bicycle is being operated, in notch 38. Upper rotating stem restraining collar 60$c$ hooks onto the raised flanges 39$a$ on the lower threadless locking collar 120 allowing the two collars to rotate with respect to each other but not come apart as shown on vertical side section A-A (FIG. 11B).

Again the stem and the interior collar shapes are integral to each other as they were in FIGS. 6A-B, but in this case the rotating stem restraining collar 60$c$ turns along with the round shaped stem 4$a$, on the steerer when the drop flange 39, on the threadless locking collar 120 is manually lowered out of the notch 38 by pushing down on lever arm 40. Not shown, but apparent to those skilled in the trade, is any cross sectional shaped stem and matching collar where the collar is a two part collar with the upper collar able to rotate relative to the lower collar. The cross sectional shape does not have to be the same shape after having been rotated 90 degrees as is the case with interior stems which rotate when pulled all the way up. While drop flange 39 is shown, any number of other restraining devices could be used to secure the upper and lower collars from rotating relative to each other.

Various methods for avoiding unwanted rotation have been shown. One method is to simply block the protrusion that rides in a track from entering the horizontal rotation track. Another is to stop the entire stem from being moved to the height where the protrusion could enter a rotation track. There are a wide variety of methods to block a stem from being moved to a specific height. FIG. 12B shows a vertical cross-section of a round tracked stem 4*b*, with vertical riding track 7, a top horizontal track 11*a*, which is inaccessible to fixed protrusion 86 unless a top button 19, held in cap 3, pushes down the rod 15, depressing spring 19*a*, and lowering the control disk 15*a*, which had been forcing the ball bearings 21, in an outward position in slot 23*a*, blocking vertical movement of surrounding collar 22.

When the button 19 is pushed down, the ball bearings 21, are allowed to move inward allowing the surrounding collar 22 to move upward compressing the surrounding collar spring 20, and allowing the stem to be lowered such that the fixed collar fixed protrusion 86, reaches the horizontal top rotation track 11*a*, allowing the round tracked stem 4*b* to rotate for storage.

FIG. 12B illustrates a method where the blocking apparatus is mounted on the stem as opposed to FIG. 12A where the blocking apparatus is mounted on the collar/steerer tube. The blocking method shown in FIG. 12B could also be used on any of the other rotatable interior steering assemblies shown. It should also be pointed out that FIG. 12B, for the first time, shows the safety control button being located on the stem and not on the collar.

Not shown but apparent to those skilled in the art is a shaped stem 4, and corresponding collar or steerer tube, with an octagonal or other shape which, on shaped stem 4 ends becoming and round rotation area 5*a* above a line just below the horizontal track 11*a*.

In some cases, multiple protrusions can be used riding in one or more tracks. FIG. 12A shows multiple protrusions riding in one track. FIGS. 13A-C show multiple protrusions riding in multiple tracks. FIG. 12A is a vertical section of a height controlled round tracked stem 4*b*, with a round bottom, with a vertical riding track 7, with bottom height control recessed bumps 29, held in a fixed stem restraining collar 60, having a fixed protrusion 86, and a retractable protrusion 80, which can be retracted with the spring loaded button 103, controlled by the lever arm 104, rotating off the pivot point 105 which holds the fixed protrusion 86. When quick release axle 72 is unlocked and retractable protrusion 80 is retracted, stem 4*b*, can move vertically, and if rotation for storage is desired, it can be pulled all the way up to its turning section 5, such that the fixed protrusion 86, can move into the horizontal rotation track 11 only if lever 104 is depressed, and then up side storage track 8 for storage. Not shown, but clear to those skilled in the art is a steering assembly using the tracking methods of FIG. 12B at the top of the stem rather than, as shown, at the bottom. In this case, side storage track 8 would not be necessary. The multiple protrusion configuration could be used on any embodiment where protrusions are used.

The steering assembly in FIGS. 13A-C, like the assembly shown in FIGS. 11A-B, does not need to be adjusted to a specific height in order to rotate. FIG. 13A shows an expanded perspective and FIGS. 13B-C show cross sections of a multitracked steering assembly which uses ball bearings riding in tracks as the safety fastening system. The round dual tracked stem 4*b*, shown in sections A-A (FIG. 13B) and B-B (FIG. 13C), is held within a two level collar where the lower portion of the steerer tube restraining collar 70 is a compression collar which squeezes onto the slotted, threaded steerer tube 111 which, in turn, squeezes onto the interior mounted stem 4*b*. The upper control stem restraining collar 60*b*, is partially separated from lower steerer tube restraining portion 70 at division point 61, where stem restraining collar 60*b* has a side opening 100, which holds a flat surrounding disk 98, with a handle 99 on the outside, and on the inside of the disk a sloping cutout 102, which forces the ball bearings 21, to remain in an outward position blocking the rotation of the stem 4*b*.

As shown in FIG. 13C top section B-B, when the handle 99 is turned to the dotted position 99', the ball bearings 21, can slide outward into the slot 23*a*, and thus out of the stem track 7, allowing the stem 4*b*, to rotate. These ball bearings 21, are being held horizontally by the holding ring 101, which, in the front, extends downward into steerer tube slot 119*b*. The steering assembly is aligned at the top or the bottom using a system similar to the one shown in FIG. 5. Two vertical riding tracks 7 are shown as well as two storage tracks 8. It is apparent to those skilled in the trade that any number of riding and storage tracks could be used.

In some situations, it may be required that the vertical stem member 4, or 4*a*, or 4*b* of an internal stem does not rotate relative to the steerer tube for storage while the horizontal member 2 of the stem does. FIG. 14 is an expanded perspective of stem, collar, and steerer tube, that has an octagonal shaped height adjustable stem 4, with a rounded top section 23, holding a stem ring 25, which keeps the stem rotating collar 26, from moving vertically. The octagonal stem 4 is married to the octagonal interior 112 of the threaded steerer tube 111. Threaded steerer tube 111 is slotted 113, with bolt holes 114, for the dual bolts 85. The rotating stem section 2 has a horizontal locking device 27, and a key 28, which enables the user to lock the stem in the rotated storage position when the bike is parked in a public place. The inner surface of the stem restraining collar 60 is threading 66 allowing it to attach to threaded steerer tube 111. This type of threaded inner surface could be used on any number of different embodiments in the present invention. It is apparent to those skilled in the trade that a two part stem such as the stem shown in FIG. 14, could be used on any internal stem embodiment in this invention.

It is generally known that, in mass production, small variations always keep components from being produced with perfect alignment. Therefore it is important to be able to, after production, align the various embodiments. FIGS. 2A-B shows a round collar which fastens to a round steerer tube making alignment easily accomplished. In FIG. 5, alignment is done using one of two different methods, a two part stem, or a break between the steerer tube and the fork crown. FIGS. 6A-B shows a offset bolt alignment system for threadless steerer tubes only.

For threaded steerer tubes, FIGS. 15A-D show a perspective and sections of a threaded compression stem restraining collar 60, with a round, tracked stem 4*b*, having a built in collar alignment system designed for threaded collars. This system is possible because the alignment drop-in piece 106 has a top round hole 84*a*, above an oval hole 84*b*. This oval hole 84*b* permits the drop-in piece 106, with its top bolt 85, with fixed protrusion 86, to move sideways for alignment. The bottom bolt 85, secures this drop-in piece 106 to the stem restraining collar 60 and steerer tube 111 when the alignment is correct. This drop-in piece 106, with its extension area 107, drops in front opening 109, and hooks onto the back opening area 108, so it does not slide outward, where both collar openings have horizontal movement space to permit sideward motion of the drop-in piece 106.

All embodiments of FIGS. 1 through 15D, show interior mounted, manually height adjustable stem steering assemblies. FIGS. 16A through 20B show another preferred embodiment using non-height adjustable exterior stems which are mounted to the steerer tube by clamping or fastening to the outside of the steerer tube. FIGS. 16A-C and 17 use vertical axial pressure to secure the stem in the rideable position. These embodiments also are shown not using the standard quick release found in many other configurations. FIG. 16A is an expanded perspective of a steering assembly using a fixed height external stem collar 30, which fits directly onto a threadless steerer tube 110, which is threaded at the top 119a. Rotation of the stem is accomplished by manually loosening the top threaded locking collar 32, with interior threading 34, thereby removing the downward forces that hold external stem collar 30 in place, then pulling upward on the horizontal section of the stem 2, which raises the external stem collar 30, lifting its notch 31, off the lower raised bump 141, on the fixed threadless locking collar 120. Fixed threadless locking collar 120 is squeezed onto the threadless section of the steerer tube 110, with locking bolt 122, permitting threadless locking collar 120 to maintain headset pressure and be aligned. As illustrated in FIG. 16A, the stem collars top edge 33a, and its bottom edge 33b are both beveled laterally and are married into the corresponding beveled edges 33 of the top threaded locking collar 32 and the beveled edge 33c, on the bottom locking threadless collar 120.

Not shown for simplicity is another notch 31 which holds the stem in the rotated position and allows the handlebar stem to be used to steer the bicycle a short distance into a parking location. It is possible that the steering assembly shown in FIG. 16A could be retrofitted onto existing bicycles in some situations. It should be noted that no quick release lever is shown in FIG. 16A. Setting the bearings pressure is done simply by releasing locking bolt 122, then tightening top threaded locking collar 32 until the headset is adjusted properly, then tightening locking bolt 122 for riding. Alignment is accomplished by simply rotating locking threadless collar 120. If a completely threaded steerer tube is used, then locking threadless collar 120 is threaded on its inner surface and external stem collar 30 is made with a slightly larger inner diameter. Adjustable tilt arm 14 is shown in situations where an angle adjustable stem is required rotating about bolt 18. Lower raised bump 141 is shown on the side, however it could easily be in the front or back, or be replaced by multiple notches or teeth that have corresponding members on the locking threadless collar 120. Various shapes of teeth could also be used. The top threaded locking collar could be equipped with an additional flip out lever to increase the moment arm of the rider when locking it. In addition, not shown for simplicity is a spring loaded protrusion, mounted on the outside of external stem collar 30 and poking through a hole to rest on steerer tube 110 in an area where steerer tube 110 had a bumpy surface, which would require that the spring loaded protrusion be continually activated by the rider in order to rotate the stem for storage.

Other modifications not shown include the top threaded locking collar being replaced by a quick release cam type collar with no major effect on the configuration. It is obvious to those skilled in the trade, that the threaded portion of the threadless steerer tube 110 could be replaced by a removable quill type threaded insert into a completely threadless steerer tube.

FIG. 16B shows a steering assembly similar to FIG. 16A except the top threaded locking nut 32b is integrally connected to inner bolt 142 which threads into the inside of a steerer tube which has a threaded inner surface 112h. The interior threading on a steerer tube 112h could be used to apply vertical pressure in any configuration where vertical pressure is required. It can also be used to apply vertical pressure to set the adjustment of the headset bearings.

FIG. 16C again shows a steering assembly similar to FIGS. 16A and 16B except notch 141 is replaced by an exterior shaped octagonal steerer tube 112i which rides against inner stem surface 31a and does not allow rotation unless top threaded locking nut 32b is loosened within the inner steerer tube threading 112h, and the external stem collar 30 is allowed to raise above the exterior shaped steerer tube 112h. More leverage can be achieved using lever arm 138 which raises out of slot 134 when used around axis 135. Not shown but obvious to those skilled in the trade are any number of other cross sectional shapes or tracks replacing the octagonal shape. In addition, not shown for simplicity is an inner stem surface 31a which is round on the lower part and shaped on the upper part allowing rotation after raising the stem only part way off the shaped steerer tube shape 112i. In addition, steerer tube shape 112i could be round and threaded at the top allowing for a top threaded locking collar 32 as shown in FIG. 16A, to be used.

FIG. 17 illustrates a steering assembly similar to FIGS. 16A-C, except in this case the external stem collar 30 has an interior square truncated sloping pyramid shape 129 which fits onto a truncated shaped interior slotted collar 124, with slot 125 and recessed bolts 122a, which in turn, is squeezed onto threadless steerer tube 110, with top threaded area 119a. Again the top stem collar must be raised clear of the lower shape after the top threaded locking collar 32 is unscrewed in order for rotation to occur. Not shown but apparent to those skilled in the trade are any number of other cross sectional shapes or tracks, or serrated round surfaces that allow 90 degree rotation replacing the truncated square pyramid shape. Also not shown is a top threaded locking nut 32b as shown in FIG. 16B with a threaded inner surface 112h on the steerer tube could also be used. Like FIG. 16A, FIG. 17 could be retrofitted onto certain existing bicycles. Truncated shaped interior slotted collar 124 could also have an interior threaded surface if the steerer tube were completely threaded.

FIGS. 18, 19A-B, and 20A-B show stem compression collars on exterior stems that are not height adjustable and are equipped with a primary locking system and a secondary safety lock. FIG. 18 is a perspective of an exterior, fixed height, rotation, retrofitable, slotted compression stem 37, with a threadless steerer tube and a standard star nut cap 42. Rotation is accomplished by unlocking quick release lever 65, pressing down on lever arm 40, and rotating stem 2. Unlike FIGS. 16A-C and 17, the stem in FIG. 18 does not need to move upward along the vertical steering axis direction in order to rotate since drop flange 39 is retractable. On the bottom of the collar is a notch 38, but this time it works with the retractable drop flange 39, activated by pushing down on the lever arm 40, overcoming the lever spring 41, on the lower threadless locking collar 120. The star nut cap 42, is tightened onto the collar with the star nut bolt 46, connected to the star nut 49 (not shown), but backed off enough to let the collar rotate when the quick release 65, is released. Not shown but apparent to those skilled in the art is a system where retractable drop flange 39 and notch 38 are reversed. Also not shown is a second storage notch. It could also be possible to fit retractable drop flange 39 into quick release compression slot 62.

FIG. 19A is a side vertical section having an upper slotted compression rotating stem 37, similar to the stem shown in FIG. 18 only this time, instead of having a secondary safety lock such as notch and locking flange 38 and 39, it has a interior rotation restraining device, projecting button 43, with a beveled finger opening cut 44, and an outward pushing spring 45. Projecting button 43 restrains the stem from rotation by fastening it directly to the steerer tube as opposed to a collar as is the case in FIG. 18. In order to rotate for storage, quick release 65 is released, and projecting button 43 is depressed. Not shown is a second finger opening cut 44 for storage. Bearings 46a allow bolt 46 to rotate relative to the star nut cap 42.

FIG. 19B shows a top view horizontal section of a restraining button this time moved to the side of the slotted compression stem collar 37, and activated indirectly by an outside button 48, which pushes on the inside projecting button 43 when activated.

FIG. 20A is a expanded perspective and FIG. 20B a side vertical cross-section A-A of a round slotted compression external stem 37, similar to the configuration of FIGS. 18, 19A, and 19B, again with an interior rotation restraining projecting button 43 only in this case a controlled spring 50 is used allowing only a minimum spring depression ensuring the restraining projecting button 43 stays within an interior rotation channel 47, to prevent over-rotation and to prevent undesired vertical movement of the collar and to allow the protrusion to reach another opening cut 44, used for storage. FIG. 20B, section A-A illustrates the steerer tube and bearings.

In lieu of a star nut and problem solver as used before, FIG. 20A uses two threaded interlocked collars 120, and 120a where collar 120a, is locked with nuts 122, then its exterior threaded surface 136, turns against the interior threaded surface 137, of threadless locking collar 120, using wrench slot 123, achieving the correct vertical pressure on the headset bearings 131, and then it is locked with locking bolt 122. This system of threaded interlocking collars can be used on any threadless steerer tube in this invention in order to set headset bearing adjustment.

It is possible that manual rotation is required with tool adjustable height. This embodiment is shown in FIGS. 21A-C, 22A-B, and 23A. FIG. 21C is a combined vertical cross-section A-A of FIG. 21A, and FIG. 21A is a perspective of a quill-type, tool height adjustable, internal round stem 4b, with a deep serrated top area 55, held to the horizontal stem section 2, with a dual dimensionally stable system having internal pressure cylinders 90b, connected together with stem through bolt 52, and the cylinders having deep serrated areas 51, which are pressed against the stem deep serrated area 55 to avoid rotation. At the bottom of the stem the quill 53, holds the stem to the steerer tube with a quill bolt 54. When quick release 65 is released, stem 2 is still not able to rotate because deep serrated area 55 is still interlocked with cylinders deep serrated areas 51. When quick release 65 is rotated in a loosening manner or hand adjusted nut 67 is loosened, the two deep serrated surfaces release allowing for stem rotation. In this way, the quick release must be released, and a secondary action is required in order to allow for rotation.

FIG. 21B shows an alternate option with a one sided dimensionally stable system where the bolt 52 is threaded directly into the stem 2 and there is only one internal pressure cylinder 90b. Shown also is a serrated area 56, where the stem can be held in the storage position. This system could be retrofitted on any existing bicycle. It is clear that the internal pressure cylinders 90b could be located on the back side of steerer tube so that stem can be angle adjustable. In addition, these cylinders could be of the oblique variety. Not shown but apparent to those skilled in the art, is the use of the serrated rotation system found in FIG. 21A and FIG. 21B in the embodiments of FIG. 5, or FIG. 14, or in combination with any of the other manually height adjustable options. It could also be used in FIGS. 6A-B and FIGS. 7A-E to allow for rotation of those embodiments. In addition, stem member 4b of FIGS. 21A-B could be replaced by a threadless steerer tube 110 where the top area of the steerer tube is deeply serrated corresponding to the serrated pressure cylinders.

Another dimensionally stable, tool height adjustable stem is shown in FIGS. 22A-B. FIG. 22A shows an expanded perspective and FIG. 22B a vertical section A-A of a two piece quill-type, tool height adjustable, internal, round stem 4b. The stem has a pyramid shaped top 53a, having a top internal threaded area 35, and which is allowed to rotate by unscrewing the top pressure nut 32b, with its lower threaded bolt area 32a, then lifting the external stem collar 30, with its interior pyramid shape 129 so the stem can be rotated. This stem could be retrofitted onto any existing bicycle. It is steerable in the rotated position. Not shown but apparent to those skilled in the art are any number of other restraining shapes such as an octagon or serrated round or other shapes that allow a 90 degree rotation. Also not shown is the use of the shaped system found in FIGS. 22A-B in the embodiments of FIG. 5, or FIG. 14, or in combination with any of the other manually height adjustable options. It could also be used in FIGS. 6A-B and 7A-E to allow for rotation of those embodiments.

All steering assemblies shown in FIGS. 1 through 22B have a primary locking system which fastens the stem to the steerer tube at, or concentric to, the steering axis. In the embodiments shown in FIGS. 23A-B and 24A-E, the primary locking system is located in a position other than at the steering axis. FIG. 23A is again a quill-type, tool height adjustable, internal two part, round stem 4b, held with remote locking system, where the fastening bolt 57, is held with a remote stem restraining arm 56, either bolted or welded as shown to the vertical round section 4b, having a quill 53 at the bottom. When quick release 65 is released, bolt 57, is then pushed down and the disk 57a can escape the multi-level box 59 allowing for rotation of the stem 2.

A more complete overview of this system can be seen in the sections shown in FIGS. 24A-E. Spring 58 keeps disc 57a resting in an upward position and therefore disc 57a cannot exit multi-level box 59 unless spring 58 is compressed. Likewise, when rotating the handlebar stem to the riding position, disc 57a cannot enter multi-level box 59 unless spring 58 is compressed. In this way, the stem is always locked if it is in the riding position. The embodiment of FIG. 23A is retrofittable on any existing bicycle. The height of the round stem 4b, can be set for a specific rider, then the stem horizontal section 2 can be rotated for storage and allowed to drop to the lowest position without loosing the tool height adjusted level of round stem 4b. When quick release 65 is locked and pulls the horizontal stem section 2 together with the remote stem restraining arm 56, it removes any unwanted minute movement between stem section 2 and section 4b.

Not shown but apparent to those skilled in the art, is locating the remote fastening device on the rear or side of the steering axis allowing for the use of an angle adjustable horizontal stem member. Like FIGS. 22A-B, the rotation system of FIG. 23A can be used in a number of other embodiments of this invention.

FIG. 23B shows an external stem which fastens to an internally mounted remote restraining arm while FIG. 24A shows an internally mounted stem which fastens to an externally mounted remote securing arm. FIG. 23B shows a steering assembly very similar to FIG. 23A except the stem is an external, non-height adjustable stem where stem horizontal section 2 is mounted directly to the outside of steerer tube 110, and remote stem restraining arm 56 attaches to the inside of steerer tube 110 using a quill system. Stem horizontal section 2 is held between two locking collars 126 and 140. Not shown but apparent to those skilled in the art is an assembly where remote stem restraining arm 56 fastens to the exterior of the steerer tube 110 in the form of a locking collar giving an assembly where an exterior stem and an exterior locking device are fastened using an offset fastening position.

FIG. 24A is a vertical cross-section of a remote secured, fixed height, internal stem system with a fastening bolt 57 having a bottom disk 57a, which must be depressed in order for it to clear the multi-level box 59 for stem rotation. In the riding position as shown in FIG. 24A and front section A-A (FIG. 24B), the stem horizontal section 2, and the remote securing arm 56a, are squeezed together by the fastening bolt 57. The views B-B, C-C and D-D illustrate various phases of operation.

When the quick release 65 is released, the bottom disk 57a remains trapped in the box as shown in side and top sections B-B (FIG. 24C), but when quick release 65 is pushed down, disk 57a drops down to an area where it can clear the box as shown in FIG. 24D which also shows section C-C. FIG. 24E includes section D-D with the disk 57a having moved outside the box 59, and quick release 65 pushed back up by spring 58 whereby the disk 57a is unable to re-enter the box. In this figure the stem is rotated just far enough so that disk 57a is no longer in lock box 59. For the rotated stem to go back to the riding position, the quick release 65 must be depressed again to allow disc 57a to re-enter box 59 and then quick release 65 must be tightened down. This acts as a safety feature so the bicycle can never be ridden in an unsecured manner. The assembly shown in FIGS. 24A-E could be retrofitted onto some existing bicycles.

All rotatable embodiments shown so far, have always rotated along the steering axis. It might be required that a steering assembly rotate for storage such that rotation occurs at a location other than the steering axis. FIG. 25 is a perspective of a height adjustable, two part interior stem with a remote front pivot post 128, held to a lower horizontal stem section 127 with lock box 59, and to the upper horizontal stem section 2. To rotate the stem, stem quick release 65 is released in the same manner as shown in FIGS. 23A-B, and 24A-E. In order to adjust the height, collar 60 quick release 65 is used.

The assembly in FIG. 25 allows for a narrower profile when the steering assembly is rotated wherein the handlebars, in the rotated position, rest closer to the plane of the bicycle frame than they would if a steering axis rotation were used. Not shown but obvious to those skilled in the trade, the axis of rotation could be to the rear or sides of the steering axis depending on the desired storage position of the handlebar. Also not shown is an assembly where member 127 is exterior mounted onto the steerer tube for a non height adjustable assembly. Also not shown is the use of the rotation system found in FIG. 25 in the embodiments of FIG. 5, or FIG. 14, or in combination with any of the other manually height adjustable options. It could also be used in FIGS. 6A-B and 7A-E to allow for rotation of those embodiments. Also not shown is an assembly where both fastening and rotation points are offset from the steering axis.

FIGS. 26A-C show perspectives of a shaped stem 4 and a interior shaped 112a threadless steerer tube 110 which is squeezed with a compression stem restraining collar 60 onto the stem 4 in the same manner as FIG. 5, however, in this case, the stem has a fold down capability. The stem 4 with front track 7, connected to an angled sloping downward track 11, which travels approximately 110 degrees on rotation area 5 and then turns downward continuing onto a lower vertical track 74 on the stem lower portion 79, has two side flanges 77, and a cut away area 78 to house the upper flange 76, and pivots about the fold-down rotation point 75. Perspectives show the stem in the riding and in the fold down position so the handlebar would be set parallel to the ground. The collar, steerer tube and headset are the same as FIG. 5. When folded down for storage fixed protrusion 86 encounters the end of track 74 and therefore lower stem portion 79 is not allowed to exit the threadless steerer tube 110 and the bicycle is steerable using the folded down handlebars for rolling into a storage location. Not shown for simplicity is a similar stem where the sloping downward track 11 is located on lower stem portion 79.

Not shown, but apparent to those skilled in the art are many other combinations of stem/steerer tube shapes as well as a spring loaded protrusion and vertical movement track which would not allow vertical movement without continually activating a button. Also not shown are a wide variety of hinge configurations.

We claim:

1. A steering assembly for a bicycle comprising; a front wheel fork having an integral upwardly extending steerer tube, headset bearings coaxial with said steerer tube, a handlebar assembly, a primary locking system and a secondary retention system coupling said handlebar assembly to said steerer tube, wherein relative movement between the handlebar assembly and the steerer tube can only be accomplished after said primary locking system is first unlocked and then the secondary retention system is held manually disengaged during said relative movement between said handlebar assembly and said steerer tube.

2. The steering assembly of claim 1, wherein, said secondary retention system comprises means preventing relative movement between the handlebar assembly and the steerer tube irrespective of the state of said primary locking system.

3. The steering assembly of claim 1, wherein said primary locking system and said secondary retention system are configured for operation by hand without the use of tools.

4. The steering assembly of claim 1, further comprising manually operated means to allow said handlebar assembly to rotate relative to said steerer tube for storage.

5. A steering assembly of claim 1 further comprising means to prevent said handlebar assembly from being raised beyond a predetermined minimum insertion level for safe riding.

6. A steering assembly for a bicycle comprising; a front wheel fork having an integral upwardly extending, non folding steerer tube, headset bearings coaxial with said steerer tube, a stem for mounting a handlebar assembly, a primary locking assembly of said handlebar assembly to said non folding steerer tube and comprising a shaped inner surface of an outer member adapted to be clamped to a shaped outer surface of said stem mounted concentrically inside, wherein both of said shaped surfaces are not round, and could not be made round by the removal of a notch or protrusion.

7. A steering assembly of claim 6, further comprising a handlebar stem as a portion of said handlebar assembly and wherein said inner member is a vertically extending portion of said handlebar stem.

8. A steering assembly of claim 7, wherein said stem is manually height adjustable.

9. A steering assembly of claim 6, wherein said outer member is a portion of said non folding steerer tube.

10. A steering assembly of claim 9, wherein said non folding steerer tube is clamped onto a stem by a collar mounted external to said non folding steerer tube.

11. A steering assembly of claim 6, wherein said outer member is a clamping collar mounted to said non folding steerer tube.

12. A steering assembly of claim 11, wherein said clamping collar is operated by hand without the use of tools.

13. The steering assembly of claim 6, further comprising manually operated means to allow said handlebar assembly to rotate relative to said non-folding steerer tube for storage.

14. The steering assembly of claim 13, further comprising a secondary retention system and, means to prevent said handlebar assembly from rotating back to a riding position without the engagement of the secondary retention system.

15. The steering assembly of claim 13, further comprising means to engage said handlebar assembly to said front wheel fork when the front wheel fork is in the storage position such that the front wheel fork can be used to steer the bicycle for parking or during walking.

16. A steering assembly of claim 6 further her comprising means to prevent said stem from being raised beyond a predetermined minimum insertion level for safe riding.

* * * * *